United States Patent
Colodny et al.

(10) Patent No.: US 10,482,552 B2
(45) Date of Patent: *Nov. 19, 2019

(54) SYSTEM AND METHOD FOR EFFICIENT AND AUTOMATIC REPORTING AND RETURN OF LOST ITEMS

(71) Applicant: Chargerback, Inc., Carson City, NV (US)

(72) Inventors: Brian Colodny, Reno, NV (US); Michael McLaughlin, Gardnerville, NV (US)

(73) Assignee: Chargerback, Inc., Carson City, NV (US)

( * ) Notice: Subject to any disclaimer, the term of this patent is extended or adjusted under 35 U.S.C. 154(b) by 482 days.

This patent is subject to a terminal disclaimer.

(21) Appl. No.: 15/488,377

(22) Filed: Apr. 14, 2017

(65) Prior Publication Data

US 2017/0221162 A1    Aug. 3, 2017

Related U.S. Application Data

(63) Continuation-in-part of application No. 14/158,658, filed on Jan. 17, 2014, now Pat. No. 9,626,645.
(Continued)

(51) Int. Cl.
*G06Q 50/14* (2012.01)
*G06Q 30/00* (2012.01)
(Continued)

(52) U.S. Cl.
CPC .......... *G06Q 50/14* (2013.01); *G06Q 30/016* (2013.01); *G06K 19/06028* (2013.01); *G06Q 10/025* (2013.01)

(58) Field of Classification Search
CPC ...... G06Q 50/14; G06Q 30/016; G06Q 40/08; G06Q 10/10; G06Q 20/203; G06Q 10/063; G06F 17/50
(Continued)

(56) References Cited

U.S. PATENT DOCUMENTS

| 5,955,952 A | 9/1999 | Bergman |
| 6,259,367 B1 | 7/2001 | Klein |

(Continued)

OTHER PUBLICATIONS

Office Action for U.S. Appl. No. 13/224,247, dated Jun. 21, 2013.
(Continued)

*Primary Examiner* — Dung K Chau

(57) ABSTRACT

In one embodiment, a system and method for receiving itinerary information and user information for a reservation for a user where the user has opted to acquire lost item protection for use with at least part of the reservation; receiving a lost item notification from a computing device associated with a notifier, the lost item notification including at least notifier information and lost item information; retrieving itinerary information from the first database associated with the user when it is determined that the notifier information from the lost item report matches the user information stored in the first database; facilitating presentation of a list of one or more establishments associated with the retrieved itinerary information; and automatically generating and electronically transmitting a lost item report to the selected at least one establishment if it is determined that the establishment information is stored in the second database.

20 Claims, 12 Drawing Sheets

Related U.S. Application Data

(60) Provisional application No. 62/369,629, filed on Aug. 1, 2016.

(51) Int. Cl.
*G06Q 10/02* (2012.01)
*G06K 19/06* (2006.01)

(58) Field of Classification Search
USPC .................. 707/758; 705/4, 22, 7.24, 7.11; 340/539.13
See application file for complete search history.

(56) References Cited

U.S. PATENT DOCUMENTS

| | | |
|---|---|---|
| 6,449,611 B1 | 9/2002 | Frankel |
| 6,466,983 B1 | 10/2002 | Strazza |
| 6,604,087 B1 | 8/2003 | Kolls |
| 6,609,106 B1 | 8/2003 | Robertson |
| 7,290,288 B2 | 10/2007 | Gregg |
| 7,318,069 B2 | 1/2008 | Takahashi et al. |
| 7,379,978 B2 | 5/2008 | Anderson |
| 7,424,473 B2 | 9/2008 | Orion, III et al. |
| 7,653,553 B2 | 1/2010 | Das |
| 7,885,999 B2 | 2/2011 | St Marie |
| 7,912,842 B1 | 3/2011 | Bayliss |
| 8,370,168 B1 | 2/2013 | Jenkins et al. |
| 8,577,689 B1 | 11/2013 | Czarnetzky |
| 8,973,813 B2 | 3/2015 | Penny |
| 9,367,527 B2 | 6/2016 | Colodny et al. |
| 9,408,072 B2 | 8/2016 | Bombolowsky |
| 9,626,645 B2 | 4/2017 | Colodny |
| 9,665,913 B2 | 5/2017 | Loutit |
| 2002/0178041 A1 | 11/2002 | Krantz et al. |
| 2003/0036950 A1 | 2/2003 | Nguyen |
| 2003/0065595 A1 | 4/2003 | Anglum |
| 2004/0049396 A1 | 3/2004 | Hope |
| 2004/0124239 A1 | 7/2004 | Feld |
| 2004/0153413 A1 | 8/2004 | Gross |
| 2004/0172335 A1* | 9/2004 | Batoff .................. G06Q 20/203 705/22 |
| 2005/0033615 A1 | 2/2005 | Nguyen et al. |
| 2005/0171932 A1 | 8/2005 | Nandhra |
| 2006/0201447 A1 | 9/2006 | Meadows |
| 2007/0011017 A1 | 1/2007 | Field |
| 2007/0088569 A1 | 4/2007 | Berkelhamer et al. |
| 2007/0109126 A1 | 5/2007 | House |
| 2007/0138272 A1 | 6/2007 | Saperstein |
| 2007/0138273 A1 | 6/2007 | Saperstein |
| 2007/0226086 A1 | 9/2007 | Bauman |
| 2008/0059256 A1* | 3/2008 | Lynch .................. G06Q 10/063 705/7.24 |
| 2008/0079581 A1 | 4/2008 | Price |
| 2008/0129488 A1* | 6/2008 | Hill ........................ G06Q 10/08 340/539.13 |
| 2008/0301281 A1 | 12/2008 | Wang |
| 2009/0013060 A1 | 1/2009 | St Marie |
| 2009/0187433 A1 | 7/2009 | Nudd |
| 2009/0230191 A1 | 9/2009 | Saperstein |
| 2009/0287498 A2 | 11/2009 | Choi |
| 2009/0319561 A1 | 12/2009 | Hosp et al. |
| 2010/0035220 A1 | 2/2010 | Herz et al. |
| 2010/0332356 A1 | 12/2010 | Spolar |
| 2011/0061018 A1 | 3/2011 | Piratla et al. |
| 2012/0059661 A1 | 3/2012 | Colodny |
| 2012/0066008 A1* | 3/2012 | Scudder .................. G06Q 10/10 705/4 |
| 2012/0084165 A1† | 4/2012 | Hirose |
| 2012/0267430 A1 | 10/2012 | Penny |
| 2014/0095274 A1 | 4/2014 | McLaughlin |
| 2014/0281857 A1 | 9/2014 | Colodny |
| 2014/0327518 A1 | 11/2014 | Loutit |
| 2016/0275442 A1 | 9/2016 | Colodny |
| 2016/0300238 A1 | 10/2016 | Colodny |
| 2017/0206244 A1 | 7/2017 | Colodny et al. |
| 2017/0221162 A1 | 8/2017 | Colodny et al. |

OTHER PUBLICATIONS

Office Action for U.S. Appl. No. 13/224,244, dated Jun. 27, 2013.
U.S. Appl. No. 13/631,456, filed Sep. 28, 2012.
U.S. Appl. No. 13/842,768, filed Mar. 15, 2013.
Final Office Action for U.S. Appl. No. 13/224,247, dated Oct. 7, 2013.
Amazon "Checkout by Amazon", https://payments.amazon.com/sdui/sdui/business/cba#features, Apr. 1, 2010.
Stamps "USPS Shipping at Your Fingertips", http://www.stamps.com/welcom/, Aug. 26, 2010.
Final Office Action for U.S. Appl. No. 13/224,244, dated Jan. 8, 2014.
Final Office Action for U.S. Appl. No. 13/224,247, dated Jun. 17, 2014.
Office Action for U.S. Appl. No. 13/631,456, dated Jun. 17, 2014.
Office Action for U.S. Appl. No. 13/631,456, dated Oct. 6, 2014.
Office Action for U.S. Appl. No. 13/224,247, dated Oct. 7, 2014.
Office Action for U.S. Appl. No. 13/631,456, dated Feb. 11, 2015.
Office Action for U.S. Appl. No. 13/842,768, dated Jul. 29, 2015.
Final OA for U.S. Appl. No. 13/224,247 mailed Sep. 1, 2011.
Office Action for U.S. Appl. No. 13/631,456 dated Dec. 7, 2015.
Final Office Action for U.S. Appl. No. 13/842,768, dated Dec. 9, 2015.
Notice of Allowance for U.S. Appl. No. 13/842,768, dated Mar. 16, 2016.
Office Action for U.S. Appl. No. 14/158,658 dated Apr. 6, 2016.
Office Action for U.S. Appl. No. 13/224,247 dated Apr. 21, 2016.
Office Action for U.S. Appl. No. 13/631,456 dated May 6, 2016.
FulcrumTech, How to Create an Effective Call-to-Action; 10 Tips to Help Drive Conversions to your Email Campaign, www.fulcrumtech.net/resources/how-to-create-an-effective-call-to-action/, Jun. 2010.
Final Office Action for U.S. Appl. No. 14/497,095, dated Sep. 25, 2016.
Merriam Webster Dictionary "Coupon", http://merriam-webster.com/dictionary/coupon, Sep. 4, 2006.
Final Office Action for U.S. Appl. No. 13/224,247, dated Sep. 23, 2016.
Notice of Allowance for U.S. Appl. No. 14/158,658, dated Oct. 20, 2016.
Office Action for U.S. Appl. No. 13/224,244, dated Dec. 14, 2016.
Office Action for U.S. Appl. No. 13/224,247, dated May 9, 2017.
Final Office Action for U.S. Appl. No. 13/224,244, dated May 24, 2017.
Office Action for U.S. Appl. No. 15/181,187, dated Jun. 16, 2017.
Office Action for U.S. Appl. No. 15/170,098, dated Jun. 30, 2017.
Office Action for U.S. Appl. No. 13/631,456, dated Aug. 11, 2017.
Office Action for U.S. Appl. No. 14/497,095, dated Aug. 25, 2017.
Office Action for U.S. Appl. No. 13/224,244, dated Aug. 31, 2017.
Final Office Action for U.S. Appl. No. 13/224,247, dated Sep. 28, 2017.
Final Office Action for U.S. Appl. No. 13/224,244, dated Jan. 16, 2018.
Final Office Action for U.S. Appl. No. 15/170,098, dated Feb. 7, 2018.
Final Office Action for U.S. Appl. No. 15/181,187, dated Mar. 5, 2018.
Final Office Action for U.S. Appl. No. 13/631,456 dated Mar. 8, 2018.
Office Action for U.S. Appl. No. 15/181,187, dated Nov. 21, 2018.
Final Office Action for U.S. Appl. No. 15/170,098, dated Dec. 31, 2018.
MS Shift, "Command and Control Your Hotel: Lost & Found—Admin User's Guide," www.msshift.com, © 2009.
MS Shift, "Command and Control Your Hotel: Lost & Found—User's Guide," www.msshift.com, © 2008.
"Command and Control your Hotel with MS Shift Hotel Security Systems" brochure, www.msshift.com, © 2008.

(56) References Cited

OTHER PUBLICATIONS

Notice of Intent to Issue Ex Parte Reexamination Certificate, U.S. Appl. No. 90/014,004, dated Aug. 14, 2018.
Office Action in Ex Parte Reexamination Certificate, U.S. Appl. No. 90/014,004, dated May 1, 2018.
Decision on Petition under 37 CFR 1.515 and 1.81, U.S. Appl. No. 90/014,004, dated Jan. 17, 2018.
Order Denying Request for Ex Parte Examination, U.S. Appl. No. 90/014,004, dated Aug. 14, 2018.
Request for Ex Parte Examination, U.S. Appl. No. 90/014,004, dated Aug. 25, 2017.
Order Denying Request for Ex Parte Examination, U.S. Appl. No. 90/014,004, dated Oct. 18, 2017.
Final Office Action for U.S. Appl. No. 15/181,187, dated Apr. 3, 2019.
Office Action for U.S. Appl. No. 15/382,267, dated Apr. 4, 2019.
MS Shift, Inc. Command and Control Your Hotel-Lost and Found—User Guide (2008) p. 1-27.†
MS Shift, Inf. 2005 Brochure (2005) p. 1-4.†

\* cited by examiner
† cited by third party

My Hotel

*Courtesy Notification from My Hotel*

Your item has been recovered! Please click the appropriate button below to confirm whether or not you would like the item(s) returned.
Should you choose to have the item(s) returned, you will be guided through the appropriate steps on our secure website.

Please Select An Option

[RETURN TO ME] [DO NOT RETURN] [HOLD FOR PICKUP]
Return To Me   Do Not Return   Hold For Pickup

FIG. 5A

*Courtesy Notification from Silver Legacy Resort Casino*

Your item has been recovered! Please click the appropriate button below to confirm whether or not you would like the item(s) returned.
Should you choose to have the item(s) returned, you will be guided through the appropriate steps on our secure website.

Please Select An Option

[RETURN TO ME]   [DO NOT RETURN]
Return To Me    Do Not Return

FIG. 5B

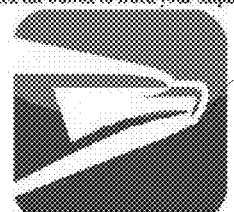
FIG. 7A
FIG. 7B

SYSTEM AND METHOD FOR EFFICIENT AND AUTOMATIC REPORTING AND RETURN OF LOST ITEMS

CROSS-REFERENCE TO RELATED APPLICATION

This application is a continuation-in-part of U.S. application Ser. No. 14/158,658, filed Jan. 17, 2014 and entitled "SYSTEM, METHOD, AND APPARATUS FOR LOCATING AND MERGING DOCUMENTS," which is hereby incorporated herein by reference. This application also claims priority benefit to U.S. Provisional Application No. 62/369,629 filed Aug. 1, 2016 and entitled "SYSTEM, METHOD, AND APPARATUS FOR LOCATING AND MERGING DOCUMENTS," which is hereby incorporated herein by reference.

This application is also related to U.S. patent Ser. No. 15/476,971 entitled "System, method and Apparatus for Locating and Merging Data Fields of Lost Records with Found Records" filed Apr. 1, 2017, which is hereby incorporated herein by reference.

BACKGROUND OF THE INVENTION

Everyone has forgotten a personal item at least once. Once lost, the items may or may not ever be returned to the rightful owner. For example, when on vacation, a user may forget an item(s) in a hotel room. In another example, a customer may forget an item in a rental car, sporting event, or any other establishment or event. The most common item left in hotel rooms is chargers, such as a cell phone charger. However, any other valuable items may also be lost or left behind such as clothing, cell phones, jewelry, and the like. Typically the establishment personnel simply toss the lost items in a lost-and-found box, wait for a phone call from the customer, and then rummage through the lost-and-found box to see if the description provided by the customer matches any item in the lost-and-found box.

For the customer, he needs to first recall where he may have lost the item. As with many customers, when traveling, it may be difficult to remember where an item may be lost. Thus, the customer ends up having to call all establishments or locations he visited during a trip to locate the item. The customer needs to locate the phone number, call the establishment or location and hope to be in contact with the right person, and then wait (either while on the phone or after calling the establishment) for the establishment or location to locate the item. Unfortunately, the establishment or location may not even locate the item and may or may not contact the customer to inform him. This is not an efficient way for a customers to report and locate lost items.

If the item is found, establishment personnel then need to contact a shipping company, such as FedEx, UPS, or package the item and drop it off at a post office. The guest is typically charged for the return of their lost item, which is typically very expensive since the hotel does not have favorable shipping rates. Since the process is laborious and costly, either the hotel simply does not make the effort to return the lost item to the customer and/or the customer decides to forgo the lost item to simply buy a new item at a lower cost.

SUMMARY

Embodiments of the invention allow users to efficiently report and recover their lost items in a cost effective and efficient manner from an establishment. Since many of the processes are automated and more cost effective, the cost of shipping is lower than the cost to replace the lost item. Moreover, if the customer purchases lost item protection, such as lost item insurance, the cost of return for the lost item may be at a reduced cost or free. As such, a consumer (and establishment) may be more inclined to have their lost items returned rather than buying a new one. Furthermore, automatically contacting each establishment, associated with the lost item protection or insurance, on behalf of the client makes it more efficient to report and attempt to locate the lost item. If the lost item is found, a shipper may be notified and shipping information may be transmitted to the establishment and the client to notify them that the lost item has been found and when it will be returned to the client. For example, a website may be used to report, query, and notify clients of the existence of a lost item.

In one embodiment, a system for reporting of lost items, comprises a third party server operable to: a third party server operable to: i) communicate with a computing device associated with a user; ii) identify a purchase or reservation of goods or services from at least one establishment via the computing device, each purchase or reservation having itinerary information and user information; iii) determine if lost item protection is obtained, the lost item protection being associated with the identified purchase or reservation of goods or services; and iv) associate the itinerary information and a confirmation of lost item protection with the user if it is determined purchase lost item protection was obtained. A recovery server is operable to: i) receive itinerary information, confirmation of lost item protection, and user information from the third party server; ii) determine if user information matches customer information in a first database; iii) associate and store the received itinerary information and confirmation of lost item protection with the customer information in the first database if it is determined that the user information matches customer information in the first database; iv) store the received itinerary information, confirmation of lost item protection, and user data in the first database if it is determined that the user information does not match customer information in the first database; v) receive a lost item notice from the computing device, the lost item notice including customer information and lost item information; vi) determine if the customer information from the lost item notice matches customer information stored in the first database; vii) retrieve itinerary information associated with the customer if it is determined that the customer information from the lost item notice matches the customer information stored in the first database; viii) facilitate presentation of a list of each establishment associated with the itinerary information, the list being presented on a display of a device associated with the user; ix) receive a selection of at least one establishment; x) determine if establishment information associated with the selected at least one establishment is stored in a second database; and xi) automatically generate and transmit a lost item report to the at least one establishment if it is determined that the establishment information is stored in the second database.

In another embodiment, a method for automatically reporting lost items, comprises i) identifying, by the third party server, a purchase or reservation of the good or service, each purchase or reservation including itinerary information and user information; ii) identifying, by the third party server, if lost item protection was obtained; iii) associating lost item protection confirmation with the itinerary information and user information if lost item protection was identified; iv) transmitting, by the third party server, the itinerary information, user information, and lost item protection confirmation to a recovery server; v) determining, by the recovery server, if user information matches customer information in a first database; vi) associating and storing the received itinerary information and confirmation of lost item protection with the customer information in the first database if the determining if user information matches customer information determines that the user information matches customer information in the first database; vii) receiving, at the recovery server, a lost item notice from a computing device associated with the customer, the lost item notice including customer information and lost item information; viii) determining, by the recovery server, if the customer information from the lost item notice matches customer information stored in the first database; ix) retrieving itinerary information associated with the customer if it is determined that the customer information from the lost item notice matches the customer information stored in the first database; x) facilitating presentation of a list of each establishment associated with the itinerary information, the list being presented on a display of a device associated with the user; xi) receiving a selection of at least one establishment; xii) determining if establishment information associated with the selected at least one establishment is stored in a second database; and xiii) automatically generating and transmitting a lost item report to the at least one establishment if it is determined that the establishment information is stored in the second database.

In an embodiment, a computer implemented method for reporting lost items, comprises receiving itinerary information and user information for a reservation for a user where the user has opted to acquire lost item protection for use with at least part of the reservation; storing the itinerary information and the user information in a first database; receiving a lost item notification from a computing device associated with a notifier, the lost item notification including at least notifier information and lost item information; determining whether the notifier information from the lost item report substantially matches user information stored in the first database; retrieving itinerary information from the first database associated with the user when it is determined that the notifier information from the lost item report matches the user information stored in the first database; facilitating presentation of a list of one or more establishments associated with the retrieved itinerary information, the list of one or more establishments being presented on a display of the computing device associated with the notifier; receiving a selection of at least one establishment from the list of one or more establishments being presented; accessing establishment information associated with the selected at least one establishment from the first database or a second database; and automatically generating and electronically transmitting a lost item report to the selected at least one establishment if it is determined that the establishment information is stored in the second database.

Other aspects and advantages of the invention will become apparent from the following detailed description taken in conjunction with the accompanying drawings which illustrate, by way of example, the principles of the invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIGS. 5A-5B illustrate example screen shots of a recovery notification.

FIGS. 7A-7B illustrate example screen shots of shipment notifications.

DESCRIPTION OF EXAMPLE EMBODIMENTS

Embodiments are described herein in the context of a system and method for efficient reporting and return of lost items. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Embodiments of the invention allow users to recover their lost items in a cost effective and efficient manner from an establishment. Since many of the processes are automated and more cost effective, the cost of shipping is lower than the cost to replace the lost item. As such, a consumer (and establishment) may be more inclined to have their lost items returned rather than buying a new one. Additionally, lost item protection or insurance may be purchased prior to a trip to make recovery of the lost item efficient and less costly for the consumer and establishment.

Several embodiments of the invention are discussed below with reference to FIGS. 1-8. However, those skilled in the art will readily appreciate that the detailed description given herein with respect to these figures is for explanatory purposes as the invention can extend beyond these limited embodiments.

Figure 1:
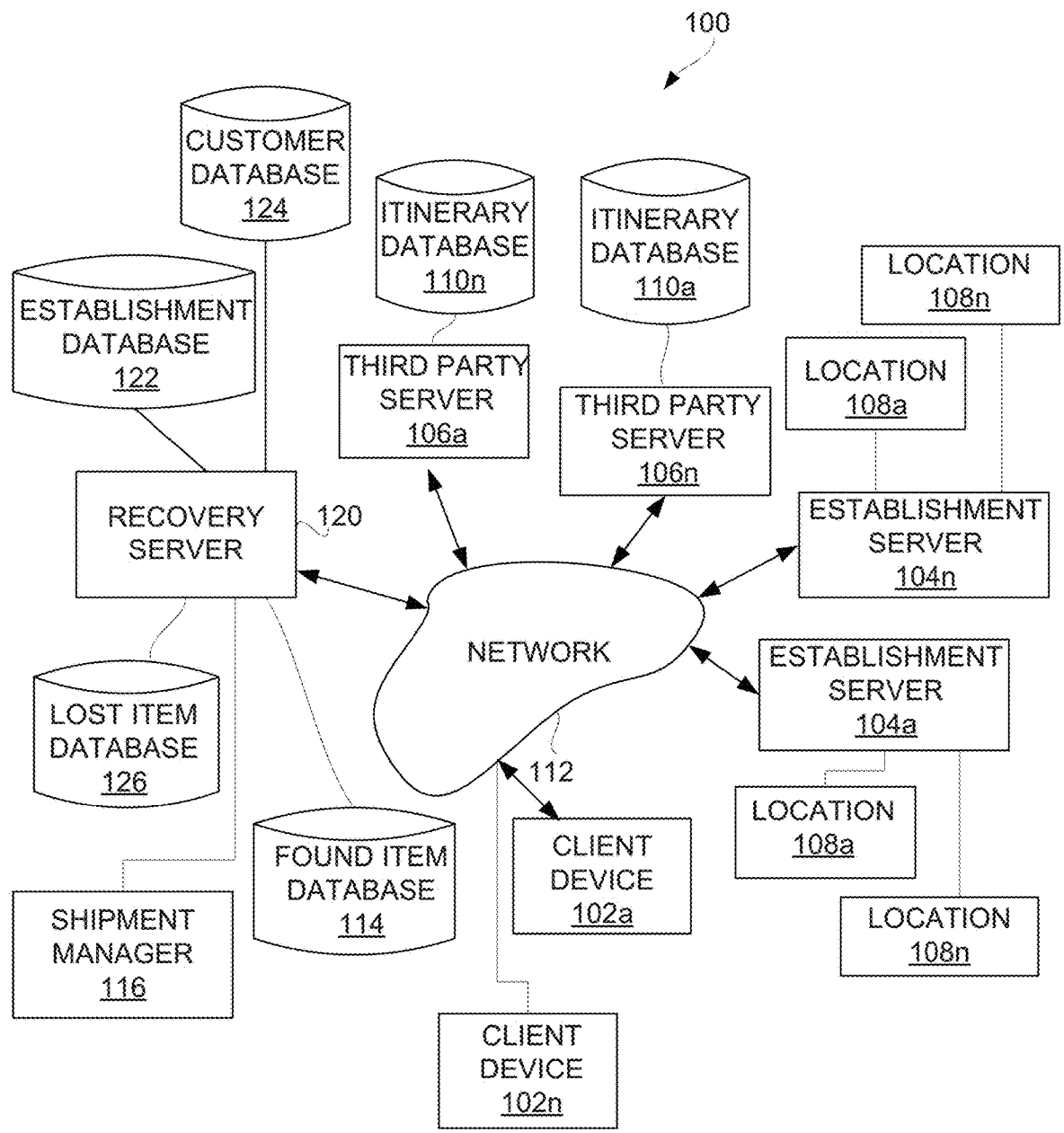
FIG. 1 illustrates an example system for the return of lost items.

FIG. 1 illustrates an example system for the return of lost items. The system 100 can have a plurality of client computing devices 102a-n (where n is an integer) configured to communicate with a third party server 106a-n via network 112. Third party server 106a-n may be any third party able to facilitate or assist client computing devices 102a-n in planning for some or all aspects of a trip. For example, third party server 106a-n may assist client computing devices 102a-n in planning and paying for flights, rental cars, hotels, tours, tickets for an event, and the like.

Third party server 106a-n may also offer client computing devices 102a-n the option of paying for lost item insurance or protection. Purchase of lost item protection, such as lost item insurance, or allows the client to have a lost item returned to him at a reduced or no cost to client 102a-n. For example, client computing devices 102a-n may purchase lost item insurance for a stay at a hotel. If the client forgets his laptop computer at the hotel, the laptop computer may be returned to the client for free.

In another embodiment, lost item protection may be a group policy that is obtained or purchased by an establishment for the benefit of their customers. For example, lost item protection may be provided to frequent travelers on an airline. In another example, lost item protection may be provided by an employer as a benefit for its employees. In another example, lost item protection may also be provided as a subscription service to customers. Customers may purchase lost item protection for a predetermined period of time similar to a subscription, such as monthly or yearly. In these embodiments, the client may input a unique identifier, such as a policy number, rather than purchase lost item protection.

Once third party server 106a-n receives payment or a reservation from client computing devices 102a-n for at least a portion of a trip, third party server 106a-n may save the itinerary data in itinerary database 110a-n and associate the itinerary data with client computing devices 102a-n. Itinerary data may include at least client information (i.e. name, address, payment information, reservation or purchase dates, contact information, and the like), establishment information (i.e. name, address, contact information, amenities, and the like), reservation dates and/or times, payment or reservation information (i.e. credit card information, amount of payment, confirmation of reservation, and the like), lost item protection policy number, and any other desired itinerary data and information.

The establishment server 104a-n may be associated with any type of business such as a hotel, supermarket, airport, airline company, coffee shop, car rental company, school (e.g. primary school, university, college, and the like), cruise ship, movie theaters, parks and campgrounds, shopping centers, business centers, private residences, or any other location where a lost item may be found. Furthermore, the establishment server 104a-n may also be an event, such as a football game, convention, seminar, and the like.

Establishment server 104a-n may have a plurality of locations 108a-n. For example, establishment 104a-n may be a rental car company having rental locations in multiple states and multiple cities within those multiple states. Thus, establishment information may also include the location 108a-n of where the goods and/or services are obtained. For simplicity, references to establishment server 104a-n also includes location 108a-n.

Although this embodiment is described using a third party server 105a-n, it is not necessary for client computing devices 102a-n to utilize third party server 105a-n. Client computing devices 102a-n may purchase or make reservations directly via establishment server 104a-n or location 108a-n as well as purchase lost item insurance or protection from the establishment server 104a-n or location 108a-n.

Once a purchase or reservation is made at third party server 106a-n, third party server 106a-n may transmit the itinerary data to establishment server 104a-n. The transmitted itinerary data may be any information desired or necessary to inform establishment server 104a-n that client 102a-n reserved or purchased goods and/or services offered by establishment 104a-n. In the example above, client information, reservation dates, and any other desired information may be transmitted to the hotel from third party server 106a-n.

Depending on how the purchase or reservation was made by client computing device 102a-n, third party server 106a-n, establishment server 104a-n, or location 108a-n may transmit the itinerary data to recovery server 120. In another embodiment, client computing devices 102a-n may self-transmit itinerary data to recovery server 120. For example, if the purchase of lost item insurance or protection is made at establishment server 104a-n or location 108a-n, establishment server 104a-n or client computing device 102a-n may transmit the itinerary data to recovery server 120. In another embodiment, client may input and transmit the itinerary manually to recovery server 120 using client computing device 102a-n. In one example, perhaps client was switched to another flight time and/or changed to another airline because the plane had to undergo maintenance or for any other reason. Thus, in one embodiment, client may manually change the itinerary data stored at recovery server 120.

Recovery server 120 can determine whether client 102a-n is stored in customer database 124. If client 102a-n is located in customer database, the itinerary data can be saved and associated with the client 102a-n. If the customer is not located in customer database 124, the recovery server 120 may contact the client 102a-n via any known method to request client computing device 102a-n open an account and/or save customer information in customer database 124. Recovery server 120 can also locate establishment 104a-n or location 108a-n in establishment database 122. If establishment 104a-n or location 108a-n is not located in establishment database 122, recovery server 120 may contact establishment server 104a-n or location 108a-n via any known method to request establishment server 104a-n or location 108a-n open an account and/or save establishment information in establishment database 122.

An indication of the purchase of lost item insurance or protection may also be stored in itinerary database 110a-n and associated with the client computing devices 102a-n as well as establishment 104a-n and/or location 108a-n. The lost item insurance may also be associated with at least a portion of the trip. For example, purchase of lost item insurance may be associated with car rental and flight purchase. In another example, the purchase of lost item insurance may be associated with just a car rental.

If client loses an item, client computing devices 102a-n may transmit a lost item report to recovery server 120 with the hope of recovering their lost items. Client computing devices 102a-n and recovery server 120 may be connected to network 112 via any known wired or wireless manner. Client computing devices 102a-n may be any computing device such as a desktop computer, laptop, netbook, as well as any mobile computing device such as mobile (e.g., cellular) phones, media players, personal digital assistants (PDAs), and the like.

Establishment server 104 may also be configured to communicate with recovery server 120 via network 112 to transmit lost item reports, found item reports, and conduct any other transactions such as receive shipping documents from shipment manager 116, authentication of the client, and the like.

Recovery server 120 may have a lost item database 126 to store lost item reports and a found item database 114 to store found item reports. In one embodiment, the lost item reports and found item reports may be transmitted from the establishment server 104a-n to the recovery server 120. In another embodiment, the lost item reports or found item reports may be transmitted from the client computing devices 102a-n to the recovery server 120. The lost item report and the found item report may include item description such as the location of where the item was lost or found, detailed description of the item, such as color, shape, manufacturer, client contact information, current storage location of the lost item and other descriptive information. The location of where the item was lost or found may include a business name, room number, seat number, and/or additional location data of where the item was located. The item description may also include an image of the item to enhance or increase the chances of identification.

When a customer calls the establishment to report a lost or found item or if the customer themselves reports the lost or found item electronically using client computing devices 102a-n, the item and the customer may be matched using any known match validation methods. Example match validation methods as well as lost and found systems, methods and techniques are described in: U.S. patent application Ser. No. 14/158,658, entitled "System, Method and Apparatus for Locating and Merging Data Fields of Lost Records with Found Records;" U.S. patent application Ser. No. 15/476,971 entitled "System, method and Apparatus for Locating and Merging Data Fields of Lost Records with Found Records;" U.S. patent application Ser. No. 13/224,244 entitled "System and Method for Inventory and Return of Lost Items"; U.S. patent application Ser. No. 13/224,247 entitled "Maintaining and Using a Lost Item Database;" U.S. patent application Ser. No. 13/631,456 entitled "Lost Item Database to Facilitate Recovery of Lost Items;" U.S. patent application Ser. No. 13/842,768 entitled "Centralized Lost and Found System;" U.S. patent application Ser. No. 15/181,187, entitled "Lost Item Recovery with Reporting and Notifying System;" U.S. patent application Ser. No. 14/497,095, entitled "System, Method and Apparatus to Facilitate the Transfer of Items;" and U.S. patent application Ser. No. 15/382,267, entitled "System, Method and Apparatus for Locating and Merging Documents;" which are all hereby incorporated by reference for all purposes.

When a lost item report is transmitted to recovery server 120 by client computing device 102a-n, recovery server 120 can determine whether client 102a-n is in customer database 124. If client computing device 102a-n is located in customer database 124, a determination of whether client 102a-n purchased lost item insurance is made. If it is determined that lost item insurance was made, the lost item, when found, may be returned to the customer for little to no cost to the customer. If client computing device 102a-n is not located in customer database 124, a request to register and input client information into customer database 124 may be transmitted to client computing device 102a-n.

When it is determined that client 102a-n is located in customer database 124 and lost item insurance was purchased, recovery server 120 can determine which establishments 104a-n are associated with the lost item insurance. If the establishment 104a-n is a part of establishment database 122, a lost item notification may be automatically generated and transmitted to each associated establishment server 104a-n. If it is determined that establishment 104a-n is not part of establishment database 122, recovery server 120 may contact establishment 104a-n to determine whether it is willing to assist in the recovery of the lost item. Contact may be made via a telephone call, electronic transmission, or any other known method of contact. By having the client's itinerary associated with the client and stored in customer database 124, this allows for a more efficient and effective method to contact each establishment on behalf of the client 102a-n for a higher probability of recovery of the lost item. Thus, the client does not have to waste item trying to remember where the item was lost, contacting each establishment, and waiting for them to locate the lost item.

When the lost item is found, establishment server 104a-n may transmit a found item report to recovery server 120. Recovery server 120 may then transmit a recovery notification to client computing devices 102a-n to inform the customer that the lost item was found.

To determine whether the lost item report matches the found item report, any known matching methods may be used such as described in: U.S. patent application Ser. No. 14/158,658, entitled "System, Method and Apparatus for Locating and Merging Data Fields of Lost Records with Found Records;" U.S. patent application Ser. No. 15/476,971 entitled "System, method and Apparatus for Locating and Merging Data Fields of Lost Records with Found Records;" U.S. patent application Ser. No. 13/224,244 entitled "System and Method for Inventory and Return of Lost Items"; U.S. patent application Ser. No. 13/224,247 entitled "Maintaining and Using a Lost Item Database;" U.S. patent application Ser. No. 13/631,456 entitled "Lost Item Database to Facilitate Recovery of Lost Items;" U.S. patent application Ser. No. 13/842,768 entitled "Centralized Lost and Found System;" U.S. patent application Ser. No. 15/181,187, entitled "Lost Item Recovery with Reporting and Notifying System;" U.S. patent application Ser. No. 14/497,095, entitled "System, Method and Apparatus to Facilitate the Transfer of Items;" and U.S. patent application Ser. No. 15/382,267, entitled "System, Method and Apparatus for Locating and Merging Documents;" which are all hereby incorporated by reference for all purposes.

For example, the lost item description may be sorted and stored in a table or in any other format in lost item database 126. The found item description may also be sorted and stored in a table or in any other format in found item database 114. A data structure of the lost item description and the recovery item description may be compared to determine whether there is a match. Any known comparison method may be used to compare the lost item description and the recovery item description. For example, if a first image is associated with the lost item report and a second image is associated with the found item report, the images may be scanned and compared. Allowing the client and/or establishment to upload an image of the lost item may enhance the identification of the lost item. Based upon the match percentage resulting from the image scan, the lost item may be recovered. For example, if the match percentage is greater than 75%, then there is a high probability that the lost item may be located.

In one embodiment, a timestamp may be provided for each item in the database so that after a predetermined amount of time (e.g. 30 days, 3 months, 6 months), older lost item reports and found item requests may be removed, archived, and/or deleted as the probability of return decreased with time.

When recovery server 120 transmits a recovery notification to client 102a-n to inform client 102a-n that their lost item has been found, in one embodiment, the notification may include a customized and/or personalized message to the client 102a-n. For example, the notification may include a customized pre-formatted response that is transmitted to the client. In another example, the message may be a text, audio, attachment or any other type of notification message. If after a pre-determined period of time (e.g. 30 days, 2 months, 3 months, and the like) has passed and the lost item has not been found and/or the establishment 104a-n does not want to assist in the recovery of the lost item, the customized and/or personalized message may be a notification to the client 102a-n that the item was not recovered.

If the lost item was recovered, the recovery notification may include an option to have the lost item shipped to back to client 102a-n, held at the establishment 104a-n for pick-up by client 102a-n, or a rejection to not have the lost item shipped back to client 102a-n. If client 102a-n selected to have the found item held at the establishment 104a-n or location 108a-n for pick-up by client 102a-n, recovery server 120 may transmit a hold request to establishment sever 104a-n to inform them that customer will pick up the item. If client 102a-n selected to not have the recovered item returned, recovery server 120 may transmit a rejection notification to establishment sever 104a-n to inform them that the customer does not want the item returned.

If client computing device 102a-n selected to have the found item shipped back to them and recovery server 120 determines that lost item insurance was purchased by client computing device 102a-n, recovery server 120 may facilitate the receipt of shipping documents to establishment server 104a-n. Recovery server 120 may have a shipment manager 116 to procure and obtain necessary shipping documents.

If client computing device 102a-n did not purchase lost item insurance, recovery server 108 may have a payment manager (not illustrated) configured to conduct financial transactions such as obtain customer financial information, verify credit card payments, and the like. In one embodiment, payment manager may be configured to communicate with third party payment server to conduct the financial transactions. In another embodiment, payment manager may perform the financial transactions without the use of a third-party payment server. Upon payment of the shipping costs, recovery server 120 may transmit the shipping selection and payment notification to establishment server 104a-n. Payments for and shipping of lost item to client 102a-n is further detailed in: U.S. patent application Ser. No. 14/158,658, entitled "System, Method and Apparatus for Locating and Merging Data Fields of Lost Records with Found Records;" U.S. patent application Ser. No. 15/476,971 entitled "System, method and Apparatus for Locating and Merging Data Fields of Lost Records with Found Records;" U.S. patent application Ser. No. 13/224,244 entitled "System and Method for Inventory and Return of Lost Items"; U.S. patent application Ser. No. 13/224,247 entitled "Maintaining and Using a Lost Item Database;" U.S. patent application Ser. No. 13/631,456 entitled "Lost Item Database to Facilitate Recovery of Lost Items;" U.S. patent application Ser. No. 13/842,768 entitled "Centralized Lost and Found System;" U.S. patent application Ser. No. 15/181,187, entitled "Lost Item Recovery with Reporting and Notifying System;" U.S. patent application Ser. No. 14/497,095, entitled "System, Method and Apparatus to Facilitate the Transfer of Items;" and U.S. patent application Ser. No. 15/382,267, entitled "System, Method and Apparatus for Locating and Merging Documents;" which are all hereby incorporated by reference for all purposes.

Shipment manager 116 may be configured to transmit shipping documents and/or information such as a tracking number, cost and/or bill, receipt, and any other shipping information and/or documents to establishment server 104a-n. Shipment manager 116 may transmit the requested shipping documents to establishment server 104a-n via network 112. The shipping documents may be transmitted by any known means, for example via electronic mail, text, a link to where the documents may be printed, and the like. In another example, establishment server 104a-n can log into a website associated with the recovery server 120 and access the shipping documents and/or information from the website.

Establishment server 104a-n may then be able to print shipping labels (i.e. plain paper or label stock), assign a tracking number, print a receipt, and conduct any other requirements to efficiently ship the recovered item to the customer or client 102a-n.

Once the recovered item is shipped, establishment server 104a-n and/or recovery server 120 may transmit a shipped notification directly to client 102a-n to inform client 102a-n that the recovered item has been shipped. The shipped notification may also allow the client computing device 102a-n to track the shipment.

Figure 2A:
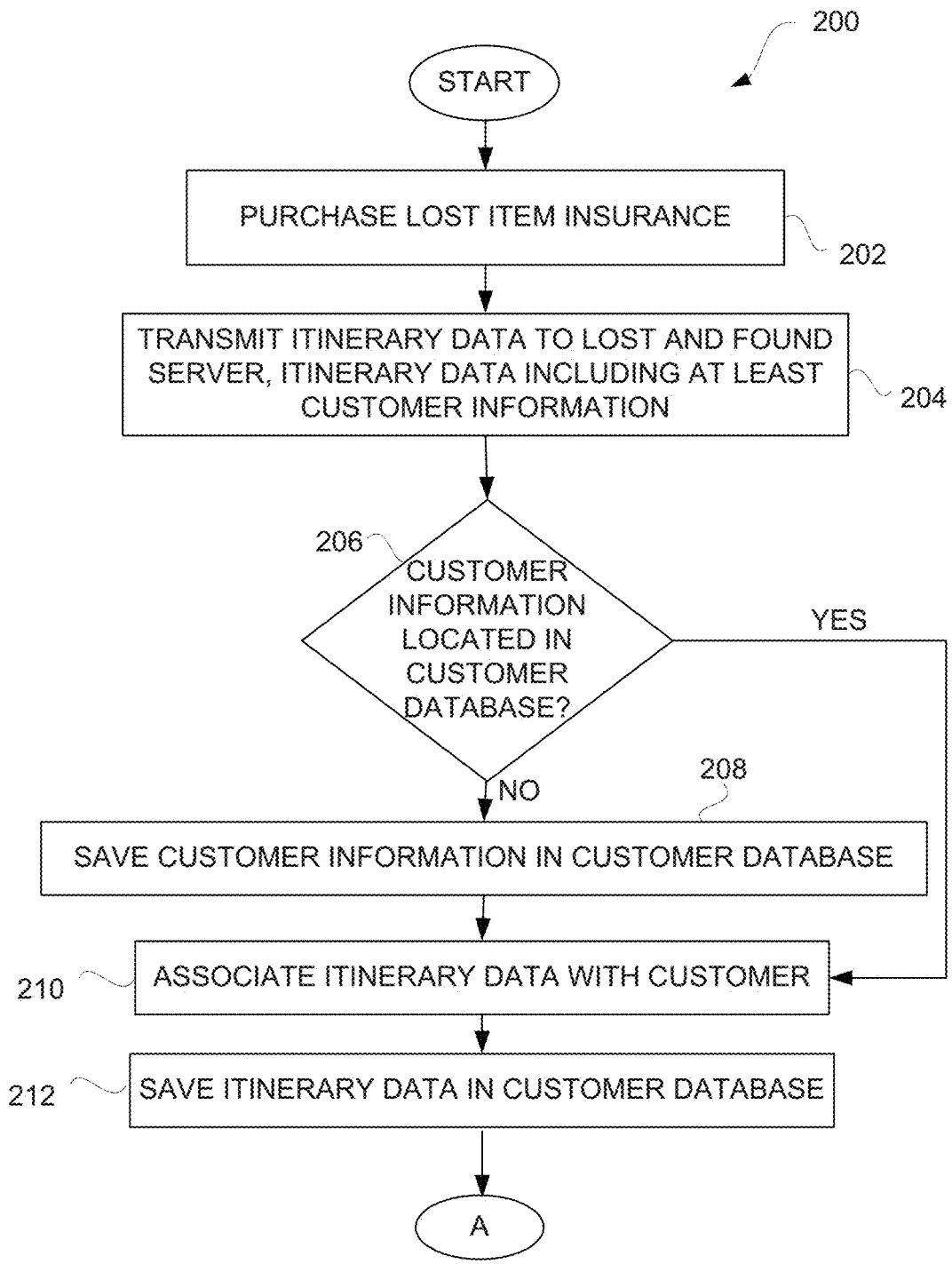
FIGS. 2A-2C illustrate an example method for reporting lost items.
Figure 2B:
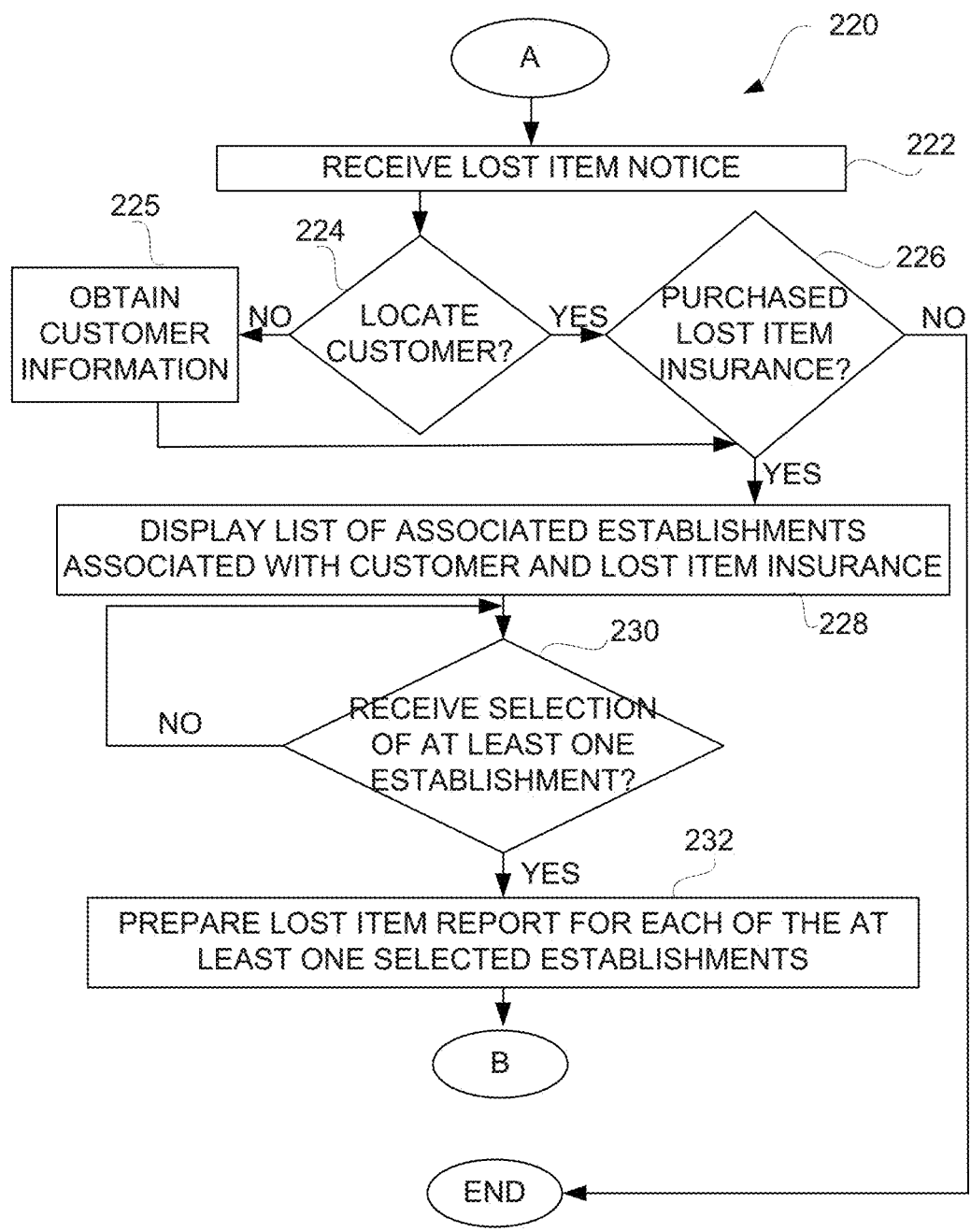
Figure 2C:
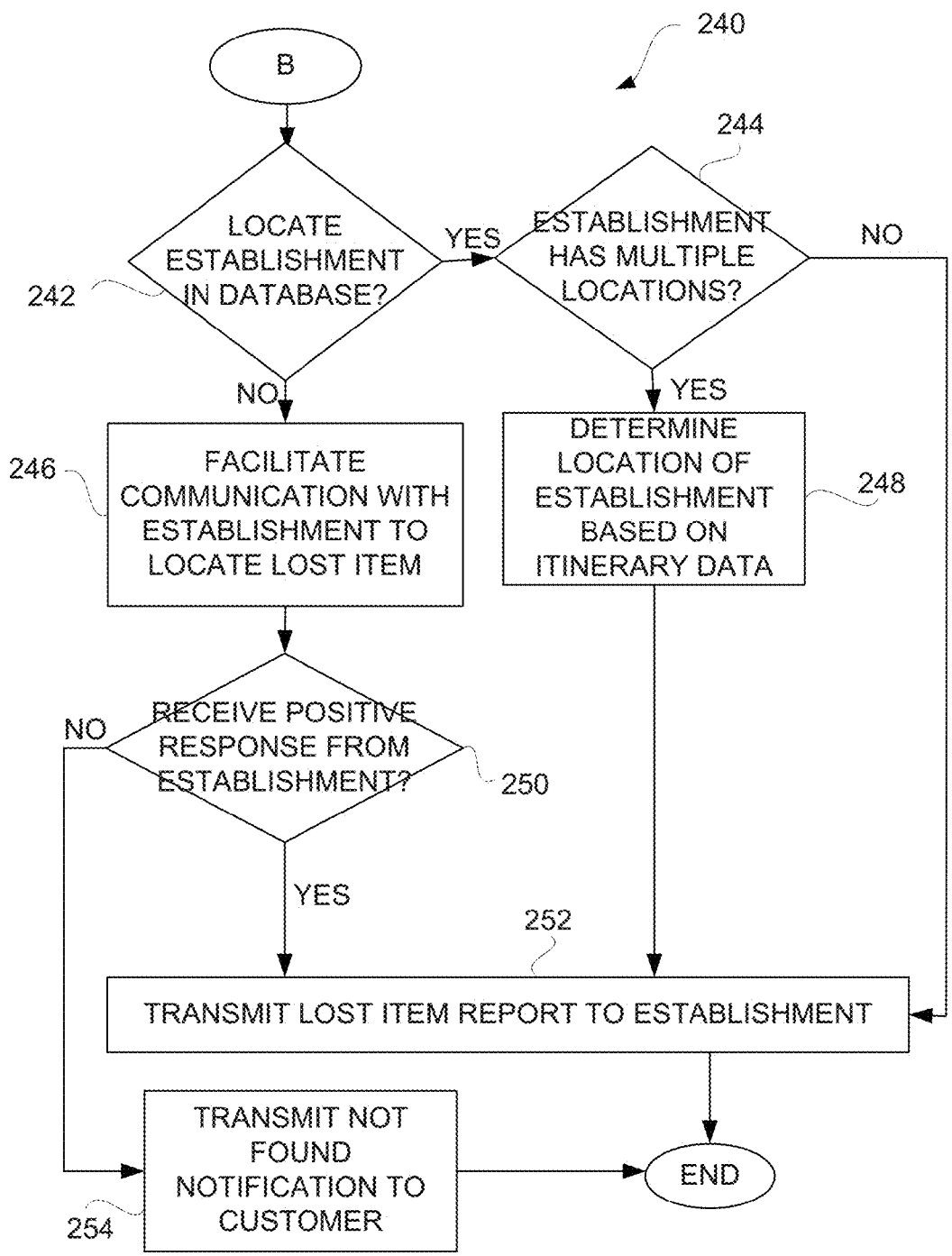

FIGS. 2A-2C illustrate an example method for reporting lost items. Referring to FIG. 2A, the method may begin with the purchase of lost item insurance by a client or customer at 202. Client may utilize a third party (i.e. such as third party server 106a-n illustrated in FIG. 1) configured to facilitate or assist client in planning for some or all aspects of a trip. For example, third party may assist client in planning and paying for flights, rental cars, hotels, tours, tickets for an event, and the like.

In another embodiment, client may contact an establishment directly to purchase their goods and/or service. The establishment may be associated with any type of business such as a hotel, supermarket, airport, airline company, coffee shop, car rental company, school (e.g. primary school, university, college, and the like), cruise ship, movie theaters, parks and campgrounds, shopping centers, business centers, private residences, or any other location where a lost item may be found. Furthermore, the establishment may also be an event, such as a football game, convention, seminar, and the like. For example, the client may contact a hotel directly to make reservations for stay in their establishment.

Establishment may have a plurality of locations. For example, establishment may be a rental car company having rental locations in multiple states and multiple cities within those multiple states. Thus, establishment information may also include the location of where the goods and/or services are obtained. For simplicity, references to the establishment also includes reference to its many locations.

Either the third party or the establishment may offer the client the option of purchasing lost item insurance. Purchase of lost item insurance allows the client to have a lost item returned to him at a reduced or no cost. For example, client may purchase lost item insurance for a stay at a hotel. If the client forgets his laptop computer at the hotel, the laptop computer may be returned to the client for free.

In another embodiment, lost item protection may be a group policy that is obtained or purchased by an establishment for the benefit of their customers. For example, lost item protection may be provided to frequent travelers on an airline. In another example, lost item protection may be provided by an employer as a benefit for its employees. In another example, lost item protection may also be provided as a subscription service to customers. Customers may purchase lost item protection for a predetermined period of time similar to a subscription, such as monthly or yearly. In these embodiments, the customer may input a unique identifier, such as a policy number, rather than purchase the lost item protection.

Once third party receives payment or a reservation from the client for at least a portion of a trip, third party may save the itinerary data in an itinerary database (i.e. itinerary database 110a-n illustrated in FIG. 1) and associate the itinerary data with the client. Itinerary data may include at least client information (i.e. name, address, payment information, reservation or purchase dates, contact information, and the like), establishment information (i.e. name, address, contact information, amenities, and the like), reservation dates and/or times, payment or reservation information (i.e. credit card information, amount of payment, confirmation of reservation, and the like), lost item protection policy number, and any other desired itinerary data.

Once a purchase or reservation is made, the third party may transmit the itinerary data to the establishment. The transmitted itinerary data may be any information desired or necessary to inform the establishment that a customer reserved or purchased goods and/or services offered by the establishment. For example, for hotel reservations, client information, reservation dates, payment information and any other desired information may be transmitted to the hotel from the third party.

Depending on how the purchase or reservation was made by the client, the third party or establishment may transmit the itinerary data to recovery server, the itinerary data to include at least customer information at 204. In another embodiment, the customer himself may self-transmit itinerary data to recovery server. For example, if the purchase of lost item insurance was made directly with the establishment, the establishment or client may transmit the itinerary data to recovery server.

Recovery server can determine whether the customer is stored in customer database at 206. If customer is located in customer database, the itinerary data can be saved and associated with the client at 210. If the customer is not located in customer database, the recovery server may, in one embodiment, contact the client via any known method to request that he open an account. In another embodiment, the customer information can be saves in the customer database at 208. The itinerary data may also be associated with the customer at 210. The itinerary data may then be saved in the customer database at 212. An indication of the purchase of lost item insurance may also be stored in the itinerary database and associated with the client. The establishments associated with the itinerary data and purchased lost item insurance may also be associated with the client and saved in the itinerary database. For example, purchase of lost item insurance may be associated with car rental and flight purchase. In another example, the purchase of lost item insurance may be associated with just a car rental.

Referring now to FIG. 2B, the method 220 begins with the recovery server receiving a lost item notice at 222 with the hope of recovering their lost items. Although described as being received from the customer, it should now be known that the lost item notice may be received in different manners. For example, the customer may be at the establishment inquiring about the lost item and the establishment may transmit the lost item notice to recovery sever on behalf of the customer. A determination of whether the customer is located in the customer database may be made at 224. If the customer is not located in the customer database at 224, the customer may be prompted to input customer information at 225 to be saved in the customer database. For example, additional customer information such as shipping address, phone number, and the like may be obtained. If the customer is located at 224 and/or inputted their information at 225, the method 220 may continue to determine whether lost item insurance was purchased at 226. If lost item insurance was not purchased at 226, the method 220 may end.

If it is determined that lost item insurance was purchased at 226, a list of establishments associated with the customer and/or lost item insurance may be displayed to the client at 228. The client may select at least one of the establishments listed. When a selection of at least one of the establishments is received at 230, a lost item report may be prepared for each of the at least one selected establishments at 232.

Referring now to FIG. 2C, the method 240 may begin with determining whether the at least one selected establishment is located in the establishment database at 242. If the at least one selected establishment is not located in the establishment database at 242, recovery server may facilitate communication with the establishment to locate the lost item. Recovery server may communicate with the establishment via any known methods such as a telephone call, electronic mail, and the like to determine if the establishment is willing to assist in the recovery of the lost item. If no response is received from the establishment at 250 within a predetermined period of time (i.e. 2 days, 5 days, 1 week, and the like), a not found notification may be transmitted to the customer at 254 and the method 240 may end. The notification may be received at any computing device associated with the customer such as a computer, laptop, media device, mobile telephone, netbook, personal data assistant, and the like.

If the at least one selected establishment is located in the establishment database at 242, a determination of whether the establishment has multiple locations may be made at 244. If the establishment has multiple locations at 244, a determination of which establishment location is associated with the itinerary data may be made at 248 to ensure that the lost item report is transmitted to the proper establishment.

One a determination of the proper establishment location is made at 248 or a positive response is received from the establishment indicating its willingness to help locate the lost item at 250, the lost item report may be automatically prepared and transmitted to the establishment at 252. This automatic preparation, location of establishments, and transmission of lost item reports to the establishments associated with the customer and/or lost item insurance make the reporting and locating of lost items efficient and less costly for all parties involved. Having the client's itinerary associated with the client and stored in customer database allows for a more efficient and effective method to contact each establishment on behalf of the client for a higher probability of recovery of the lost item. Thus, the client does not have to waste item trying to remember where the item was lost, contacting each establishment, and waiting for them to locate the lost item.

Figure 3:
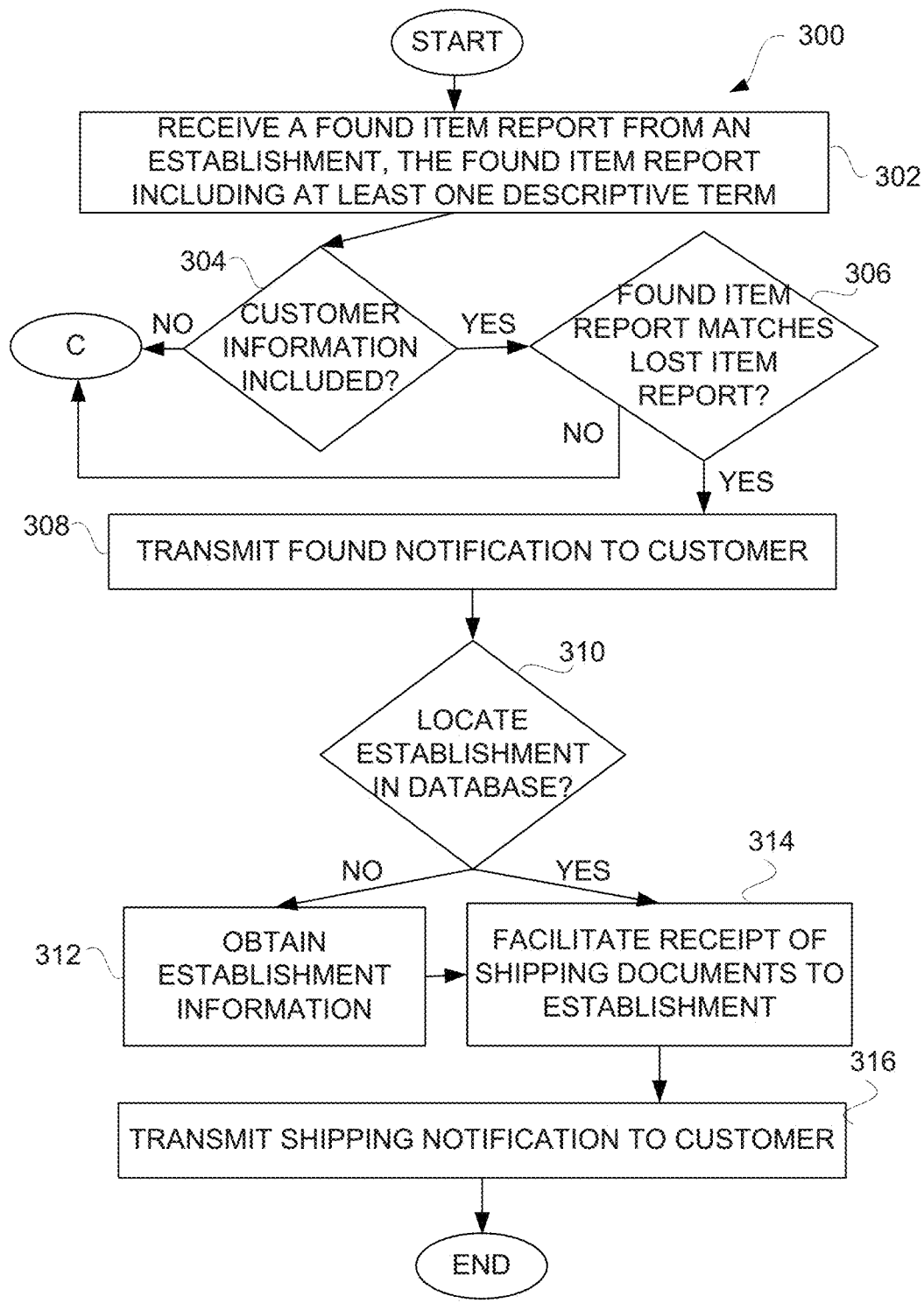
FIG. 3 illustrates an example method of an establishment reporting found items.

FIG. 3 illustrates an example method of an establishment reporting found items. The method 300 may begin with the recover server receiving a round item report from an establishment, the found item report including at least one descriptive term at 302. A determination is made whether customer information was included in the found item report at 304. If no customer information was included (i.e. the establishment does not know who the owner of the found item is), the method 300 may continue as described with reference to FIG. 4A.

However, if customer information was included in the found item report (i.e. the establishment is responding to a lost item report) at 304, a determination of whether the found item report matches the lost item report at 306. The found item report may be matched with the lost item report at 306 using any known matching methods such as those described in: U.S. patent application Ser. No. 14/158,658, entitled "System, Method and Apparatus for Locating and Merging Data Fields of Lost Records with Found Records;" U.S. patent application Ser. No. 15/476,971 entitled "System, method and Apparatus for Locating and Merging Data Fields of Lost Records with Found Records;" U.S. patent application Ser. No. 13/224,244 entitled "System and Method for Inventory and Return of Lost Items"; U.S. patent application Ser. No. 13/224,247 entitled "Maintaining and Using a Lost Item Database;" U.S. patent application Ser. No. 13/631,456 entitled "Lost Item Database to Facilitate Recovery of Lost Items;" U.S. patent application Ser. No. 13/842,768 entitled "Centralized Lost and Found System;" U.S. patent application Ser. No. 15/181,187, entitled "Lost Item Recovery with Reporting and Notifying System;" U.S. patent application Ser. No. 14/497,095, entitled "System, Method and Apparatus to Facilitate the Transfer of Items;" and U.S. patent application Ser. No. 15/382,267, entitled "System, Method and Apparatus for Locating and Merging Documents;" which are all hereby incorporated by reference for all purposes. If no match was found at 306, the method 300 may continue as described with reference to FIG. 4A.

If the found item report matches the lost item report at 306, a found notification may be transmitted to the customer at 308 informing the customer that the lost item was located. The notification may be received at any computing device associated with the customer such as a computer, laptop, media device, mobile telephone, netbook, personal data assistant, and the like. In one embodiment, the notification may include a customized and/or personalized message to the client. For example, the notification may include a customized pre-formatted response that is transmitted to the client. In another example, the message may be a text, audio, attachment or any other type of notification message.

In any event, the recovery notification may include an option to have the lost item shipped to back to client, held at the establishment for pick-up by client, or a rejection to not have the lost item shipped back to client. Upon receipt of the notification, the client may simply click the option directly from the notification on the client's computing device without having to sign-on to a website or contact the recovery server. If the client selected to have the found item held at the establishment for pick-up by the client, recovery server may transmit a hold request to establishment to inform them that customer will pick up the item. If client selected to not have the recovered item returned, recovery server may transmit a rejection notification to establishment to inform them that the customer does not want the item returned. If the client selected to have the found item shipped back to them, recovery server may automatically facilitate shipment of the found item back to the customer.

A determination of whether establishment is located in establishment database made be made at 310. If the establishment is not located in establishment database, a request for establishment information may be obtained at 312. Once establishment information is inputted into establishment database at 312 or the establishment is found in the establishment database at 310, recovery server may facilitate receipt of the shipping documents to the establishment at 314.

Recovery server may have a shipment manager to procure and obtain necessary shipping documents. The shipment manager may be configured to transmit shipping documents and/or information such as a tracking number, cost and/or bill, receipt, and any other shipping information and/or documents to the establishment. Shipping manager may be configured to communicate with any company that performs shipping services such as UPS™, United States Postal Service, DHL™, FedEx™ common carrier, local delivery service, and any other service provider to obtain the necessary shipping documents. Shipment manager may transmit the shipping documents to the establishment by any known means, for example via electronic mail, text, a link to where the documents may be printed, and the like. In another example, the establishment can log into a website associated with the recovery server and access the shipping documents and/or information from the website.

Establishment server may then be able to print shipping labels (i.e. plain paper or label stock), assign a tracking number, print a receipt, and conduct any other requirements to efficiently ship the recovered item to the customer.

Once the recovered item is shipped, the establishment and/or recovery server may transmit a shipped notification to the customer at 316 to inform the customer that the found item has been shipped. The notification may be received at any computing device associated with the customer such as a computer, laptop, media device, mobile telephone, netbook, personal data assistant, and the like. The shipped notification may also allow the customer to track the shipment.

Figure 4A:
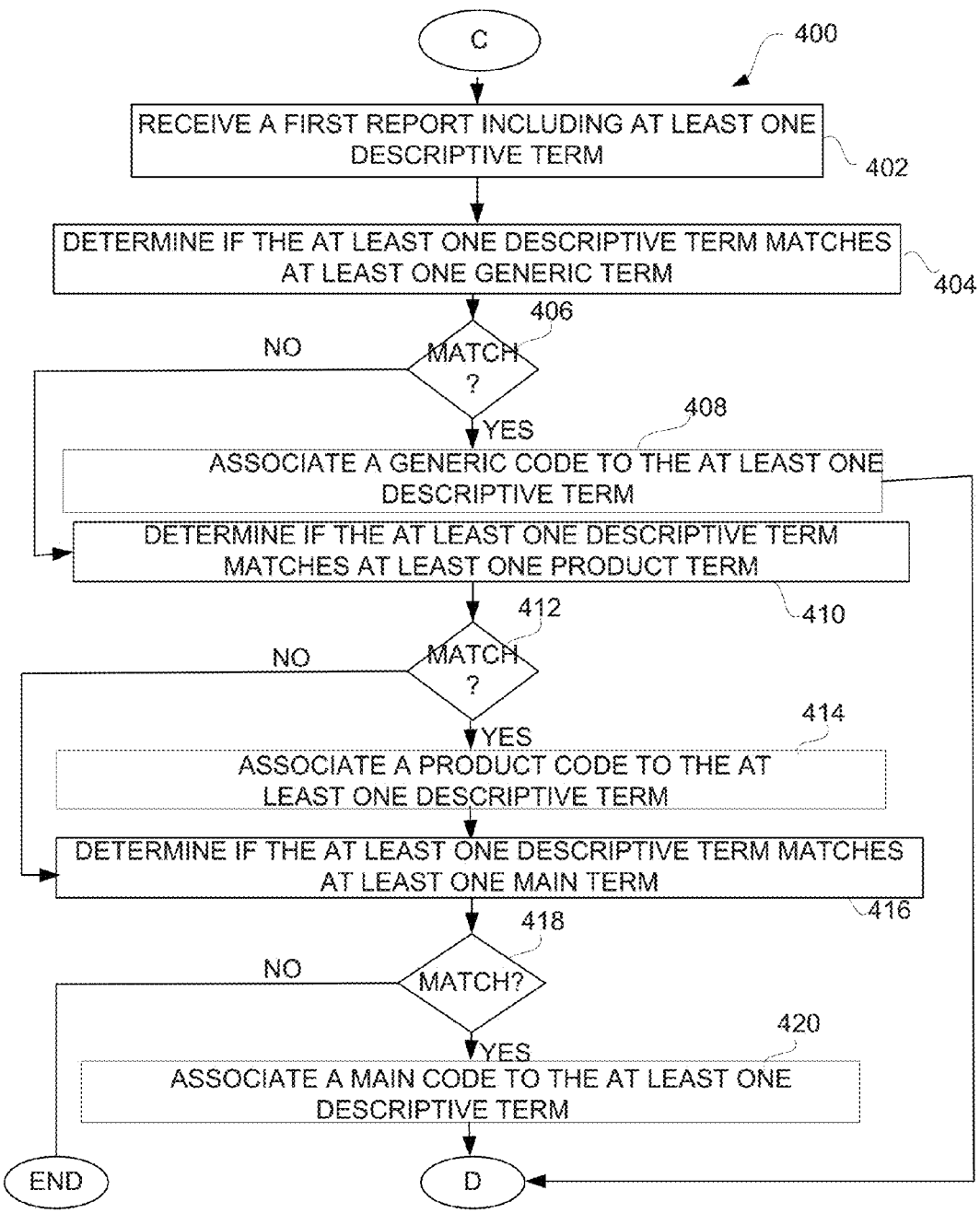
FIGS. 4A-4C illustrate an exemplary method for locating and merging lost and found records.
Figure 4B:
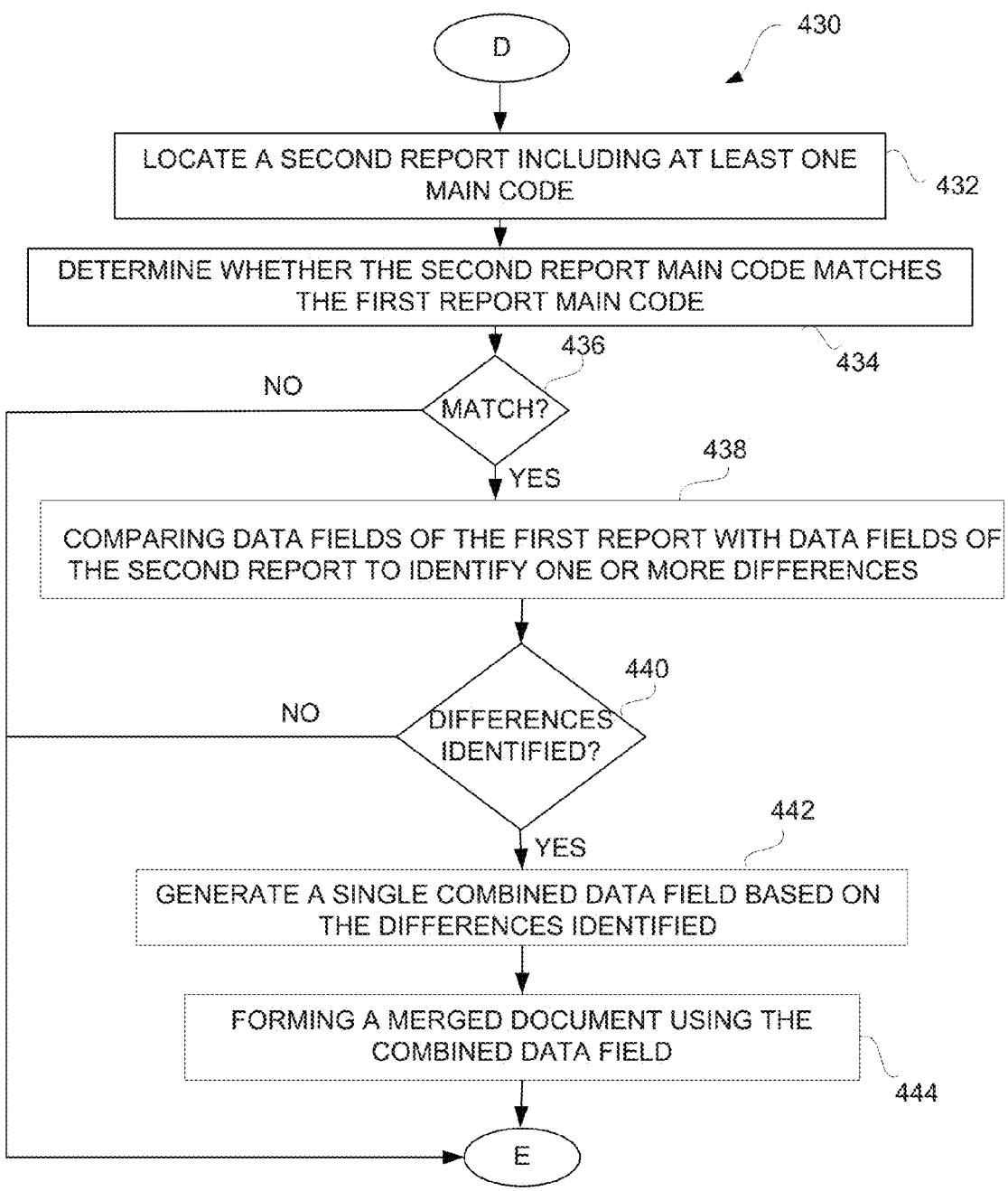
Figure 4C:
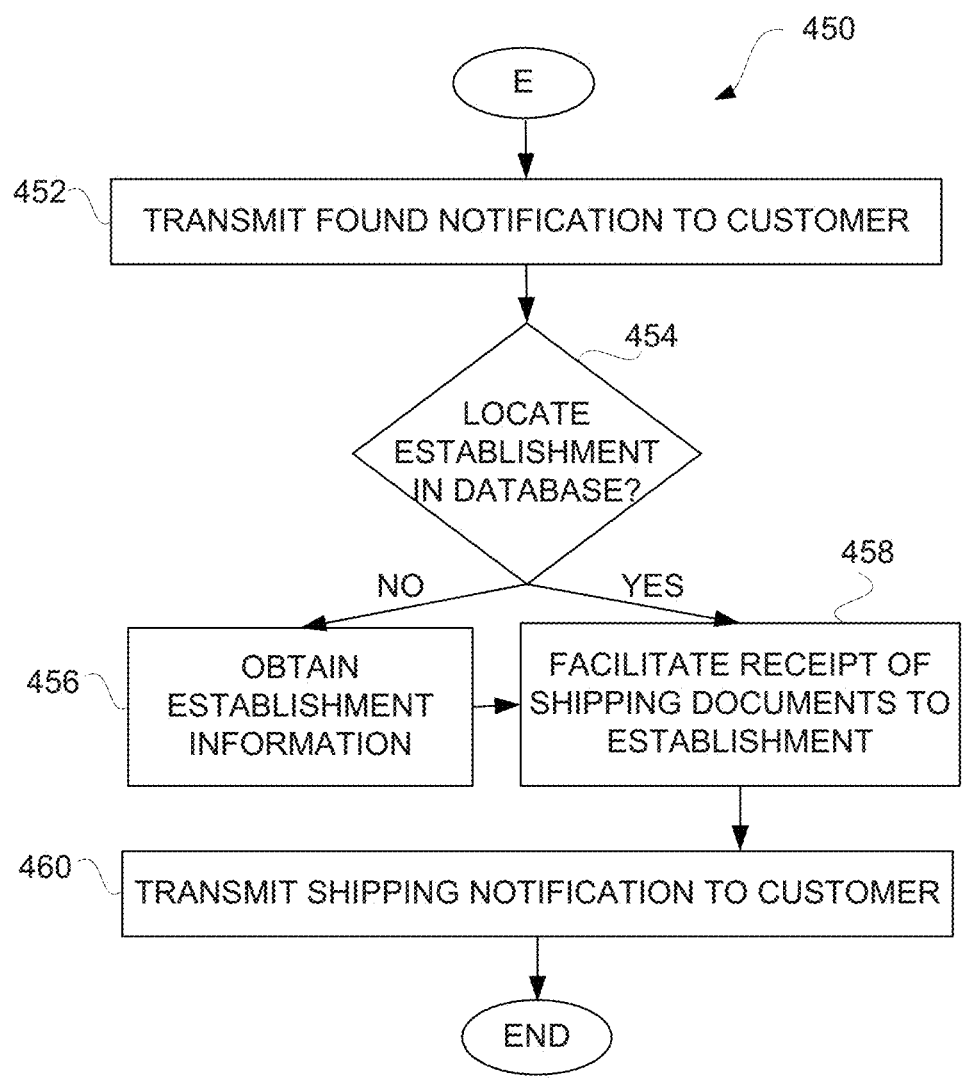

FIGS. 4A-4C illustrate an exemplary method for locating and merging records. The method 400 provides that a first report may be received at 402. The report may have a plurality of data fields, including at least one descriptive term. Other data fields may also include associated codes and any other desired data fields. For example, if the first report is in response to a lost item report, customer identification may be included. Customer identification may be any customer information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Associated codes may be any codes associated with the report based upon keywords or terms obtained from the item information.

A determination if the at least one descriptive term matches at least one generic term is made at 404. If a match is found at 406, a generic code is associated with the at least one descriptive term at 408. The generic terms 128 may define what a product is. For example, under product term "SHOES", the generic terms may include sneakers, flip flop, high heel, crocks, boots and the like. In another example, product term "health beauty" may include the generic terms concealer, foundation, mineral, powder, and the like. As such, there may be substantially more generic terms than product terms, and substantially more product terms than main terms.

Each generic term 128 may be assigned a code or unique identifier. For example, "sneakers" may be assigned code 10-4B-C, "dress" may be assigned code 10-4B-GG, and the like. Although illustrated in numerical format, the code may be any unique code or identifier consisting of text, symbols, or numbers.

If no match is found at 406, a determination if the at least one descriptive term matches at least one product term at 410. If a match is found at 412, a product code is associated with the at least one descriptive term at 414. The product terms may be a higher-level term than the generic terms yet define what the products are. For example, the product terms may include pants, shirts, dress, shoes, and the like to describe the product "CLOTHING". In another example, product terms perfume, make-up, razor, soap, lipstick, and the like may describe "HEALTH BEAUTY". Each product term may be assigned a code or unique identifier. For example, "pants" may be assigned code 10-1, "shirt" may be assigned code 10-2, and the like. Although illustrated in numerical format, the code may be any unique code or identifier consisting of text, symbols, or numbers.

In one embodiment, each of the product terms and generic terms may also include alternative or misspelled keywords. For example, generic terms may include the following alternative or misspelled terms for "CROCS": "croks"; "crooks"; "krocks"; "kroks"; and any other misspelled terms. In another example, product term may include the following misspelled terms for "SNEAKERS": "sneeker"; "sneker"; "sneckr"; "snecker"; "sneaker"; and any other alternative or misspelled terms.

If no match is found at 412, a determination if the at least one descriptive term matches at least one main term is made at 416. If no match is found at 418, the method 400 may end. If a match is found at 418, a main code is associated with the at least one descriptive term at 420. The main terms may be main or high-level keyword terms to describe various products. The main terms may be a description used to describe a plurality of products. For example, main terms may include "clothing", "electronics", "sporting goods", and the like. Each main term may be assigned a code or unique identifier. For example, "clothing" may be assigned code 10. Although illustrated in numerical format, the code may be any unique code or identifier consisting of text, symbols, or numbers.

Since the main terms are high-level terms, there are less main terms than product terms and generic terms. Additionally, there are more generic terms than product terms since the generic terms are descriptive terms describing the product terms.

Referring now to FIG. 4B, the method 430 starts with locating a second report at 432. The second report, may have a plurality of data fields, including at least one main code. Other data fields may also include associated codes and any other desired data fields. For example, the second report may include customer identification. The customer identification may include information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Associated codes may be any codes associated with the report based upon keywords or terms obtained from the item information.

A determination whether the second report customer identification and main code matches the first report customer identification and main code at 434. Although described with matching the customer identification and main code data fields, this is not intended to be limiting as any data fields may be matched. For example, the customer identification and all the associated codes may be matched. If a match is found at 436, data fields of the first report with data field of the second report is compared to identify one or more differences at 438. If any differences are identified at 440, a single combined data field based on the differences identified may be generated at 442 to form a merged document using the combined data field at 444.

Although illustrated as merging two documents, this is not meant to be limiting as more than one document may be merged. For example, there may be two or more found item reports that may be merged with a single lost item report. In another embodiment, two or more lost item reports may be merged with a single found item report. Furthermore, although illustrated as merging a lost item report with a found item report, this is not intended to be limiting as two ore more lost item reports may be merged. In another embodiment, two or more found item reports may be merged. In still another embodiment, the found item report may be merged with the lost item report.

The resulting merged report or document may include information both from the first report and the second report. The merged or added information may be presented differently or separate from the information in the merged document. In one embodiment, the merged information may be presented as italics, bolded, in a different font, in a different text size, or presented in any other known different manner. In another embodiment, the merged information may be set apart from the information in the lost item report. For example, the added information may be presented and set apart in brackets, quotation marks, on another line, or set apart in any other known manner.

Referring now to FIG. 4C. The method 450 begins with transmitting a found notification to the customer at 452 to inform the customer that the lost item was located. The notification may be received at any computing device associated with the customer such as a computer, laptop, media device, mobile telephone, netbook, personal data assistant, and the like. In one embodiment, the notification may include a customized and/or personalized message to the client. For example, the notification may include a customized pre-formatted response that is transmitted to the client. In another example, the message may be a text, audio, attachment or any other type of notification message.

In any event, the recovery notification may include an option to have the lost item shipped to back to client, held at the establishment for pick-up by client, or a rejection to not have the lost item shipped back to client. Upon receipt of the notification, the client may simply click the option directly from the notification on the client's computing device without having to sign-on to a website or contact the recovery server. If the client selected to have the found item held at the establishment for pick-up by the client, recovery server may transmit a hold request to establishment to inform them that customer will pick up the item. If client selected to not have the recovered item returned, recovery server may transmit a rejection notification to establishment to inform them that the customer does not want the item returned. If the client selected to have the found item shipped back to them, recovery server may automatically facilitate shipment of the found item back to the customer.

The facilitate shipment of the found item back to the customer, a determination of whether establishment is located in establishment database made be made at 454. If the establishment is not located in establishment database, a request for establishment information may be obtained at 456. Once establishment information is inputted into establishment database at 456 or the establishment is found in the establishment database at 454, recovery server may facilitate receipt of the shipping documents to the establishment at 458.

Recovery server may have a shipment manager to procure and obtain necessary shipping documents. The shipment manager may be configured to transmit shipping documents and/or information such as a tracking number, cost and/or bill, receipt, and any other shipping information and/or documents to the establishment. Shipping manager may be configured to communicate with any company that performs shipping services such as UPS™, United States Postal Service, DHL™, FedEx™ common carrier, local delivery service, and any other service provider to obtain the necessary shipping documents. Shipment manager may transmit the shipping documents to the establishment by any known means, for example via electronic mail, text, a link to where the documents may be printed, and the like. In another example, the establishment can log into a website associated with the recovery server and access the shipping documents and/or information from the website.

Establishment server may then be able to print shipping labels (i.e. plain paper or label stock), assign a tracking number, print a receipt, and conduct any other requirements to efficiently ship the recovered item to the customer.

Once the recovered item is shipped, the establishment and/or recovery server may transmit a shipped notification to the customer at 460 to inform the customer that the found item has been shipped. The notification may be received at any computing device associated with the customer such as a computer, laptop, media device, mobile telephone, netbook, personal data assistant, and the like. The shipped notification may also allow the customer to track the shipment.

FIGS. 5A-5B illustrate example screen shots of a recovery notification. Referring to FIG. 5A, the recovery notification 500 may display several options: 1. have the recovered item returned 502; 2. not have the recovered item returned 504; and 3. have the recovered item held for pick up 506.

The recovery notification may be customized to the establishment such as including the establishment logo, tag lines, colors, and any other indicia necessary or desired by the establishment to customize the coupon. Referring to FIG. 5B, the recovery notification 510, as illustrated, is customized for Silver Legacy Hotel and Casino in Reno, Nev. including the logo 508, color scheme (not illustrated), and any other establishment requirements.

Figure 6:
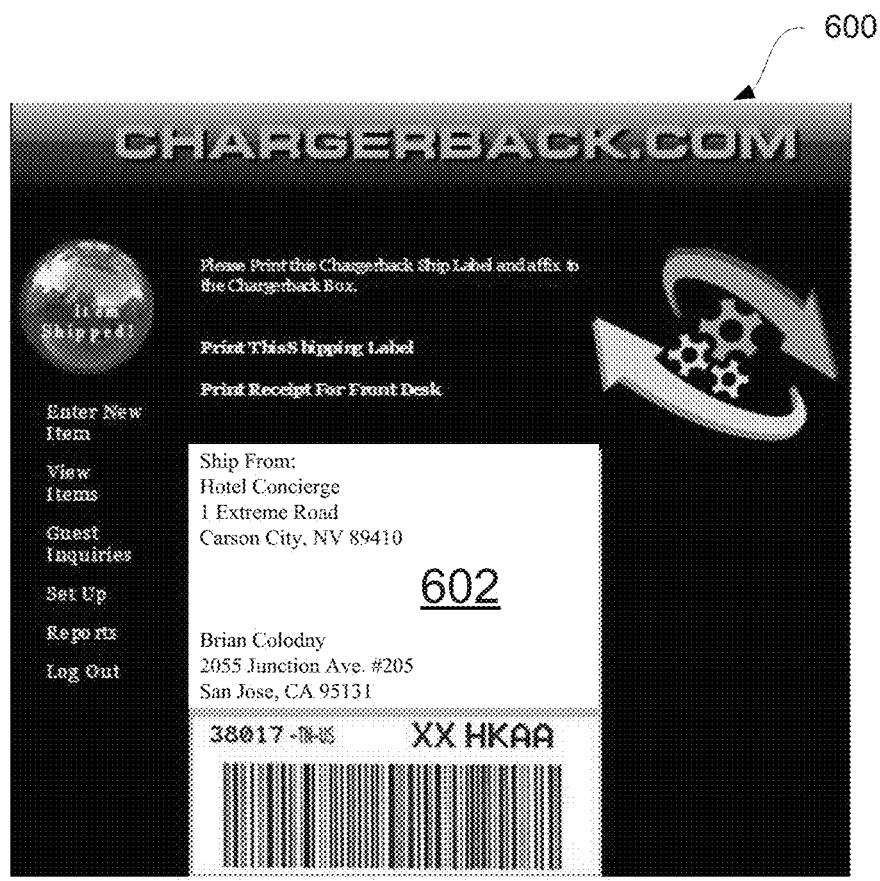
FIG. 6 illustrates an example shipping document to the establishment.

FIG. 6 illustrates an example shipping documents. In one embodiment, a shipping label 602 may be electronically transmitted to the establishment. Establishment may then notify a shipping company that the package or shipment needs to be picked up at the establishment by any known methods such as electronic mail, text message, XML, SMS, use of the shipment company's web page, telephone call, or any other notification methods. In one embodiment, the printing of the shipping documents may automatically notify the shipping company that a package is ready for pickup at the establishment.

FIGS. 7A-7B illustrate example screen shots of shipment notifications. Referring to FIG. 7A, the shipped notification 700 may notify Brian that his cell phone charger was shipped via the United States Postal Service (USPS) 702. The shipped notification 700 may also include a tracking number 704. In one embodiment, Brian may click the USPS logo 706 and be automatically directed to the USPS website to track his package. In one embodiment, the shipped notification may also include other shipping options such as the purchase of insurance, delivery confirmation, and the like.

Referring to FIG. 7B, similar to the coupon and recovery notification, the shipped notification may also be customized to the establishment. The shipped notification 710 may be customized to include the establishment logo, color scheme, tag lines, or any other customized desired by the establishment. As illustrated, the shipped notification 710 may be customized for Silver Legacy 712. Additionally, similar to FIG. 7A, the user may select the shipping company logo 714 and be automatically directed to the shipping company's website to track their package. A physical coupon or other establishment promotional material may also be included with the shipped package.

As illustrated in the example above, the invention may provide for the quick and economical return of lost items, such as chargers, cell phones, and other important valuables left at an establishment. Among other things, the invention may provide for: (i) automatic notification to a shipping company, such as FedEx, UPS, the USPS, or any other shipping company; (ii) automatic billing to the hotel shipper account; (iii) ability to print shipping documents, such as shipping labels and receipts; (iv) automatic issuance of a shipper tracking number; (v) automatic recovery notification to the client, including the tracking number; (vi) convenient billing to the client and/or establishment; and (vii) allows the establishment and client to track the shipment of the recovered item.

Figure 8:
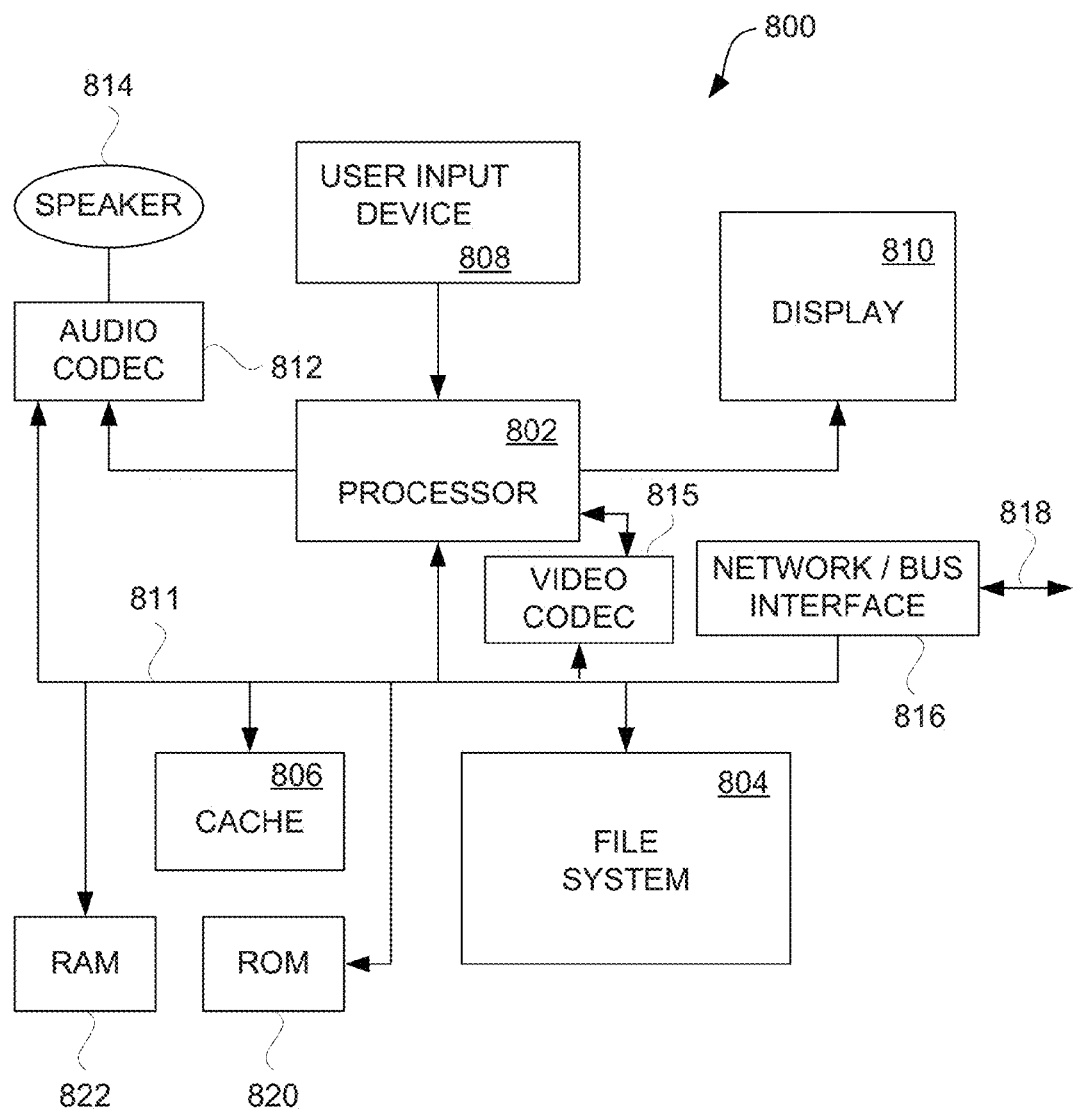
FIG. 8 illustrates a block diagram of a computing device according to one embodiment.

FIG. 8 illustrates a block diagram of a computing device 800 according to one embodiment. The computing device 800 can represent circuitry of a representative computing device (e.g. client computing device, recovery sever, shipping server, third party server, establishment server) described and illustrated in FIG. 1. The computing device can be designed to primarily stationary or can be portable.

The computing device 800 includes a processor 802 that pertains to a microprocessor or controller for controlling the overall operation of the computing device 800. The computing device 800 stores media data pertaining to media items in a file system 804 and a cache 806. The file system 804 is, typically, semiconductor memory (e.g., Flash memory) and/or one or more storage disks. The file system 804 typically provides high capacity storage capability for the computing device 800. However, since the access time to the file system 804 can be relatively slow, the computing device 800 can also include the cache 806. The cache 806 is, for example, Random-Access Memory (RAM). The relative access time to the cache 806 is typically shorter than for the file system 804. However, the cache 806 does not have the large storage capacity of the file system 804. The computing device 800 also includes a RAM 820 and a Read-Only Memory (ROM) 822. The ROM 822 can store programs, utilities or processes to be executed in a non-volatile manner. The RAM 820 provides volatile data storage, such as for the cache 806.

The computing device 800 may also include a user input device 808 that allows a user of the computing device 800 to interact with the computing device 800. For example, the user input device 808 can take a variety of forms, such as a button, keypad, dial, touch-sensitive surface, etc. Still further, the computing device 800 includes a display 810 (screen display) that can be controlled by the processor 802 to display information to the user. A data bus 811 can facilitate data transfer between at least the file system 804, the cache 806, the processor 802, an audio coder/decoder (CODEC) 812 and/or a video CODEC 815.

In one embodiment, for example, if the computing device 800 (e.g. client device 102*a-n*, establishment server 104*a-n*, recovery server 120 illustrated in FIG. 1) is a portable electronic device, the computing device 800 may store a plurality of data fields (e.g., customer information, product description, establishment information, customer information, itinerary data, lost item report, found item report, etc.) in the file system 804. When a user desires to report a lost item report the computing device may allow the user to input information in the data fields. The data fields may be displayed on the display 810. Then, using the user input device 808, a user can select one of the available data fields. The processor 802, upon receiving an input, stores the input into the data fields and, if necessary, out it to one or more appropriate output devices. If the particular media item is encrypted, the particular media item is first decrypted as noted above, which could involve one or more layers of encryption. As an example, for audio output, the processor 802 can supply the media data (e.g., audio file) for the particular media item to the audio CODEC 812. The audio CODEC 812 can then produce analog output signals for a speaker 814. The speaker 814 can be a speaker internal to the computing device 800 or external to the computing device 800. For example, headphones or earphones that connect to the computing device 800 would be considered an external speaker. As another example, for video output, the processor 802 can supply the media data (e.g., video file) for the particular media item to the video CODEC 815. The video CODEC 815 can then produce output signals for the display 810 and/or the speaker 814.

The computing device 800 also includes a network/bus interface 816 that couples to a data link 818. The data link 818 allows the computing device 800 to couple to another device (e.g., a host computer, a power source, or an accessory device). The data link 818 can be provided over a wired connection or a wireless connection. In the case of a wireless connection, the network/bus interface 816 can include a wireless transceiver.

EXAMPLE

This example is for illustrative purposes only and is not intended to be limiting. For example, although illustrated with the use of a third party server, the customer may purchase goods and/or services directly from the establishment, such as a hotel, cruise ship, airline, casino, rental car company, seminar, convention, and the like.

Mac purchases two airline tickets using www.travelwebsite.com (e.g. third party server 106*a-n* illustrated in FIG. 1) to fly from Reno, Nev. (RNO) to Los Angeles, Calif. (LAX) to take his daughter to Disneyland™. Mac may use any computing device computing device such as a desktop computer, laptop, netbook, as well as any mobile computing device such as mobile (e.g., cellular) phones, media players, personal digital assistants (PDAs), and the like.

He also books several nights at Ramada Inn™, a rental car from Avis™, as well as purchase entry tickets to Disneyland™ using the same third party website. Before making his final purchase for the flight, hotel, and Disneyland™, he decides to accept the purchase of lost item insurance realizing that he or his daughter may forget something during the trip. Mac's itinerary data and any other necessary information may be saved and associated with Mac at recovery server (e.g. recover server 120 illustrated in FIG. 1).

Sure enough, during the trip, his daughter loses her iPad, and as is common with all kids, she does not remember where she lost the iPad. Mac, however, remembers that he purchased the lost item insurance and logs into the website associated with the recovery server.

Upon logging in and being authenticated and/or validated (i.e. any authentication or validation method may be used such as a username and password, facial recognition, voice recognition, and the like) by the recovery server, Mac can report the lost iPad. A lost item notice can be generated by Mac using his computing device. A list of item descriptions may be displayed for Mac to select to input a description of the lost item. A list of establishments may also be listed so that Mac may enter the location of where the item was lost. Unfortunately, since Mac's daughter does not remember where she lost the iPad, Mac may select all the establishments, namely the airline, Ramada Inn™, Avis™, and Disneyland™.

A lost item report may automatically be generated based on the input received from Mac. The recovery server determines that the airline, Ramada Inn™, and Avis™ are a part of the recovery program, but Disneyland™ is not part of the recovery program. Thus, the lost item report is automatically transmitted to the airline, Ramada Inn™, and Avis™ to begin the process of locating the lost iPad. However, recovery server may transmit a correspondence (i.e. an electronic inquiry correspondence, a representative associated with recovery server may make a phone call to Disneyland™ to make an inquiry, or any other method to correspond with the company may be used) to Disneyland™ inquiring whether it is willing to help Mac recover his iPad.

After two days, recovery server receives a correspondence (i.e. electronic correspondence, phone call, text, and the like) from Disneyland with an indication that it is willing to help recover the lost iPad. Since Disneyland™ is not part of the recovery program, the company may be required to input establishment information in establishment server such as name, address, contact information, contact person, and any other establishment identifying information.

Once all lost item reports have been transmitted to the establishments, recovery server can transmit a notice to Mac informing him of the progress and that the lost item report has been transmitted to all the establishments.

After a few days, Avis transmits a found report to the recovery server. The found report includes found item information describing the iPad that was found in the car, including an image of the iPad. The recovery server matches the found item information with lost item information stored in its database. It turns out that the found iPad description matches the description of the lost iPad description.

Recovery server generates a found notification, which may customize the found notification with Avis'™ company information such as its logo, colors, and any other identifying information. Thus, when the found notification is transmitted to Mac's computing device, it appears as if the found notification is send from (or authorized by) Avis. This would generate additional goodwill and customer loyalty for Avis™.

Recovery server can determine that Mac paid for lost item insurance. Shipping documents can be automatically generated and transmitted to Avis™. Avis™ can then print out the shipping documents, attach it to a return package, and ship it off to Mac. And since lost item insurance was purchased, the iPad can be returned to Mac at no additional cost.

This application also related to U.S. patent application Ser. No. 13/224,244 entitled "System and Method for Inventory and Return of Lost Items" filed Sep. 1, 2011; U.S. patent application Ser. No. 13/224,247 entitled "Maintaining and Using a Lost Item Database" filed Sep. 1, 2011; U.S. patent application Ser. No. 13/631,456 entitled "Lost Item Database to Facilitate Recovery of Lost Items" filed Sep. 28, 2012; U.S. patent application Ser. No. 13/842,768 entitled "Centralized Lost and Found System" filed Mar. 15, 2013; U.S. patent application Ser. No. 15/181,187, entitled "Lost Item Recovery with Reporting and Notifying System" filed Jun. 13, 2016; U.S. patent application Ser. No. 14/497,095, entitled "System, Method and Apparatus to Facilitate the Transfer of Items" filed Sep. 25, 2014; and U.S. patent application Ser. No. 15/382,267, entitled "System, Method and Apparatus for Locating and Merging Documents" filed Dec. 16, 2016; which are all hereby incorporated herein by reference in their entirety.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment", "an embodiment", "one example" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A system for reporting of lost items, the system comprising:
   a third party server device operable to:
      communicate with a computing device associated with a user;
      identify a purchase or reservation of goods or services from at least one establishment via the computing device, each purchase or reservation having itinerary information and user information;
      determine if lost item protection is obtained, the lost item protection being associated with the identified purchase or reservation of goods or services; and
      associate the itinerary information and a confirmation of lost item protection with the user if it is determined purchase lost item protection was obtained; and
   a recovery server device operable to:
      receive itinerary information, confirmation of lost item protection, and user information from the third party server device;
      determine if user information matches customer information in a first database;
      associate and store the received itinerary information and confirmation of lost item protection with the customer information in the first database if it is determined that the user information matches customer information in the first database;
      store the received itinerary information, confirmation of lost item protection, and user data in the first database if it is determined that the user information does not match customer information in the first database;
      receive a lost item notice from the computing device, the lost item notice including customer information and lost item information;
      determine if the customer information from the lost item notice matches customer information stored in the first database;
      retrieve itinerary information associated with the customer if it is determined that the customer information from the lost item notice matches the customer information stored in the first database;
      facilitate presentation of a list of each establishment associated with the itinerary information, the list being presented on a display of a device associated with the user;
      receive a selection of at least one establishment;
      determine if establishment information associated with the selected at least one establishment is stored in a second database; and
      automatically generate and transmit a lost item report to the at least one establishment if it is determined that the establishment information is stored in the second database.

2. The system of claim 1, further comprising:
   determine if the customer information matches user information stored in the first database if it is determined that the customer information from the lost item notice does not match the customer information stored in the first database; and transmit a request for additional customer information if the customer information matches user information stored in the first database.

3. The system of claim 1, further comprising automatically generate and transmit a lost item report and inquiry notification to the at least one establishment if it is determined that the establishment information is not stored in the second database.

4. The system of claim 3, further comprising:
determine if a response from the at least one establishment is received within a predetermined period of time;
generate a not found notification if a response from the at least one establishment is not received within a predetermined period of time; and
transmit the not found notification to the computing device to inform the customer that the lost item has not been located.

5. The system of claim 1, wherein the recovery server is further operable to authenticate the customer to determine if the customer information from the lost item notice matches customer information stored in the first database.

6. The system of claim 1, wherein the recovery server is further operable to:
receive a found item notification, the found item notification including found item information;
determine if the found item information matches lost item information stored in the lost item database when the found notification is received; and
transmit a found notification to the computer device if it is determined that the found item information matches lost item information.

7. The system of claim 6, wherein the found notification includes a plurality of return item options, the plurality of return item options include at least a hold item option, a return item to me option, and a do not return item option.

8. The system of claim 7, further comprising:
determine if confirmation of lost item protection is associated with the customer information and itinerary information;
facilitate return of the found item to the customer if the return item to me option is selected, wherein the found item is returned to the customer without additional payment.

9. A method for automatically reporting lost items, comprising:
identifying, by the third party server, a purchase or reservation of the good or service, each purchase or reservation including itinerary information and user information;
identifying, by the third party server, if lost item protection was obtained;
associating lost item protection confirmation with the itinerary information and user information if lost item protection was identified;
transmitting, by the third party server, the itinerary information, user information, and lost item protection confirmation to a recovery server;
determining, by the recovery server, if user information matches customer information in a first database;
associating and storing the received itinerary information and confirmation of lost item protection with the customer information in the first database if the determining if user information matches customer information determines that the user information matches customer information in the first database;
receiving, at the recovery server, a lost item notice from a computing device associated with the customer, the lost item notice including customer information and lost item information;
determining, by the recovery server, if the customer information from the lost item notice matches customer information stored in the first database;
retrieving itinerary information associated with the customer if it is determined that the customer information from the lost item notice matches the customer information stored in the first database;
facilitating presentation of a list of each establishment associated with the itinerary information, the list being presented on a display of a device associated with the user;
receiving a selection of at least one establishment;
determining if establishment information associated with the selected at least one establishment is stored in a second database; and
automatically generating and transmitting a lost item report to the at least one establishment if it is determined that the establishment information is stored in the second database.

10. The method of claim 9, further comprising:
determining, by the recovery server, if the customer information matches user information stored in the first database if it is determined that the customer information from the lost item notice does not match the customer information stored in the first database; and
transmitting a request for additional customer information if the customer information matches user information stored in the first database.

11. The method of claim 9, wherein the determining if establishment information associated with the selected at least one establishment is stored in a second database, further comprises:
automatically generating and transmitting a lost item report and inquiry notification to the at least one establishment if it is determined that the establishment information is not stored in the second database.

12. The method of claim 11, further comprising:
determining if a response from the at least one establishment is received within a predetermined period of time;
generating a not found notification if a response from the at least one establishment is not received within a predetermined period of time; and
transmitting the not found notification to the computing device to inform the customer that the lost item has not been located.

13. The method of claim 9, further comprising: authenticating the customer to determine if the customer information from the lost item notice matches customer information stored in the first database.

14. The method of claim 9, further comprises:
receiving, at the recovery server, a found item notification, the found item notification including found item information;
determining if the found item information matches lost item information stored in the lost item database when the found notification is received; and
transmitting a found notification to the computer device if it is determined that the found item information matches lost item information.

15. The method of claim 14, wherein the transmitting further comprises:
customizing the found notification using establishment information, wherein the establishment information includes at least a logo associated with the establishment, and wherein the found notification appears to be received from the establishment.

16. A computer implemented method for reporting lost items, comprising:

receiving itinerary information and user information for a reservation for a user where the user has opted to acquire lost item protection for use with at least part of the reservation;

storing the itinerary information and the user information in a first database;

receiving a lost item notification from a computing device associated with a notifier, the lost item notification including at least notifier information and lost item information;

determining whether the notifier information from the lost item report substantially matches user information stored in the first database;

retrieving itinerary information from the first database associated with the user when it is determined that the notifier information from the lost item report matches the user information stored in the first database;

facilitating presentation of a list of one or more establishments associated with the retrieved itinerary information, the list of one or more establishments being presented on a display of the computing device associated with the notifier;

receiving a selection of at least one establishment from the list of one or more establishments being presented;

accessing establishment information associated with the selected at least one establishment from the first database or a second database; and automatically generating and electronically transmitting a lost item report to the selected at least one establishment if it is determined that the establishment information is stored in the second database.

17. The computer implemented method of claim 16, wherein the computer implemented method comprises:

electronically receiving a found item notification, the found item notification including found item information for a found item;

determining whether the found item information matches lost item information stored in the first database when the found notification is received; and electronically transmitting a found notification to the notifier when the determining determines that the found item information matches lost item information.

18. The computer implemented method of claim 17, wherein the computer implemented method comprises:

customizing the found notification using establishment information prior to the electronically transmitting thereof, wherein the establishment information includes at least a logo associated with the establishment, and wherein the found notification appears to be received from the establishment.

19. The computer implemented method of claim 16, comprising:

determining whether lost item protection is associated with the user information and the itinerary information; and facilitating return of the found item to the notifier without additional payment when the determining determines that lost item protection is associated with the user information and the itinerary information.

20. The computer implemented method of claim 16, comprising:

determining whether lost item protection is available to the notifier; and facilitating return of the found item to the notifier without additional payment when the determining determines that lost item protection is available to the notifier.

* * * * *